United States Patent
Malcolm et al.

(10) Patent No.: US 12,440,303 B2
(45) Date of Patent: Oct. 14, 2025

(54) BODY WORN BODY PART SUPPORT DEVICE AND METHOD

(71) Applicants: Roger J. Malcolm, San Clemente, CA (US); Daniel B. Kim, Mission Viejo, CA (US)

(72) Inventors: Roger J. Malcolm, San Clemente, CA (US); Daniel B. Kim, Mission Viejo, CA (US)

(*) Notice: Subject to any disclaimer, the term of this patent is extended or adjusted under 35 U.S.C. 154(b) by 721 days.

(21) Appl. No.: 17/737,881

(22) Filed: May 5, 2022

(65) Prior Publication Data
US 2022/0257336 A1 Aug. 18, 2022

Related U.S. Application Data

(63) Continuation-in-part of application No. 17/166,703, filed on Feb. 3, 2021, now Pat. No. 11,598,083, which is a continuation-in-part of application No. 16/638,079, filed as application No. PCT/US2018/046088 on Aug. 9, 2018, now abandoned, which is a continuation-in-part of
(Continued)

(51) Int. Cl.
| | | |
|---|---|---|
| *A61B 90/60* | (2016.01) | |
| *A61B 90/53* | (2016.01) | |
| *A61F 5/02* | (2006.01) | |
| *A61B 90/50* | (2016.01) | |

(52) U.S. Cl.
CPC .............. *A61B 90/60* (2016.02); *A61B 90/53* (2016.02); *A61F 5/02* (2013.01); *A61B 2090/502* (2016.02)

(58) Field of Classification Search
CPC ... A61B 90/60; A61B 90/53; A61B 2090/502; A61F 5/00; A61F 5/02; A61F 5/04; A61F 5/08
USPC ............................................. 602/17, 18, 19
See application file for complete search history.

(56) References Cited

U.S. PATENT DOCUMENTS

| | | |
|---|---|---|
| 30,601 A | 11/1860 | Wright |
| 443,764 A | 12/1890 | Hilliard |
| 5,086,757 A | 2/1992 | Lestini |

(Continued)

FOREIGN PATENT DOCUMENTS

| | | |
|---|---|---|
| WO | WO2014093408 A2 | 6/2014 |
| WO | WO2023158880 A1 | 8/2023 |

OTHER PUBLICATIONS

PCT/US2023/021064—Written Opinion of the International Search Authority, mailed Jul. 27, 2023, K. Rodriguez (Authorized Officer), 7 pages.

*Primary Examiner* — Lars A Olson
(74) *Attorney, Agent, or Firm* — Charmasson, Buchaca & Leach, LLP

(57) ABSTRACT

A body-worn device for flexibly supporting a body part such as the head in a hunched over position such as when a surgeon performs surgery. The device can include a head harness connected to a torso harness by a specialized oblong variable stiffness beam that extends upwardly along the back of the spine of the wearer. The beam can include a variable stiffness member having a complex tapered geometry. The member can be made from a unitary piece of fiber composite material wherein the orientations of the fibers are varied to provide both bending and torsional strength and stiffness that varies along the length of the member. The beam and harnesses can include a plurality of interconnected mechanisms to provide greater adjustability.

88 Claims, 14 Drawing Sheets

Related U.S. Application Data application No. 15/675,515, filed on Aug. 11, 2017, now Pat. No. 10,315,745.

(56) References Cited

U.S. PATENT DOCUMENTS

| | | |
|---|---|---|
| 5,242,377 A | 9/1993 | Boughner et al. |
| 5,306,232 A | 4/1994 | Whitmyer |
| 5,549,947 A * | 8/1996 | Quigley ................. A63B 60/00 156/169 |
| 6,886,186 B2 | 5/2005 | Jansen |
| 8,057,415 B2 | 11/2011 | Hipp et al. |
| 8,734,312 B2 | 5/2014 | Conner et al. |
| 9,072,595 B2 | 7/2015 | Grenander |
| 9,205,017 B2 | 12/2015 | Doyle |
| 9,427,865 B2 | 8/2016 | Doyle |
| 9,737,374 B2 | 8/2017 | Doyle |
| 9,872,605 B2 | 1/2018 | Doyle |
| 9,999,534 B2 | 6/2018 | Doyle |
| 10,315,745 B2 * | 6/2019 | Malcolm ................ B63H 9/065 |
| 10,485,681 B2 | 11/2019 | Herr et al. |
| 10,485,689 B1 | 11/2019 | Walsh et al. |
| 10,617,551 B2 | 4/2020 | Doyle et al. |
| 11,253,381 B2 | 2/2022 | Doyle |
| 11,598,083 B2 * | 3/2023 | Malcolm ................... F16F 1/26 |
| 11,613,001 B2 | 3/2023 | Doyle |
| 12,121,462 B2 | 10/2024 | Doyle |
| 2019/0083350 A1 | 3/2019 | Weidner et al. |
| 2019/0152048 A1 | 5/2019 | Doyle |
| 2019/0290468 A1 | 9/2019 | Briant |
| 2020/0146923 A1 | 5/2020 | Doyle |
| 2022/0105373 A1 | 4/2022 | Doyle |

* cited by examiner

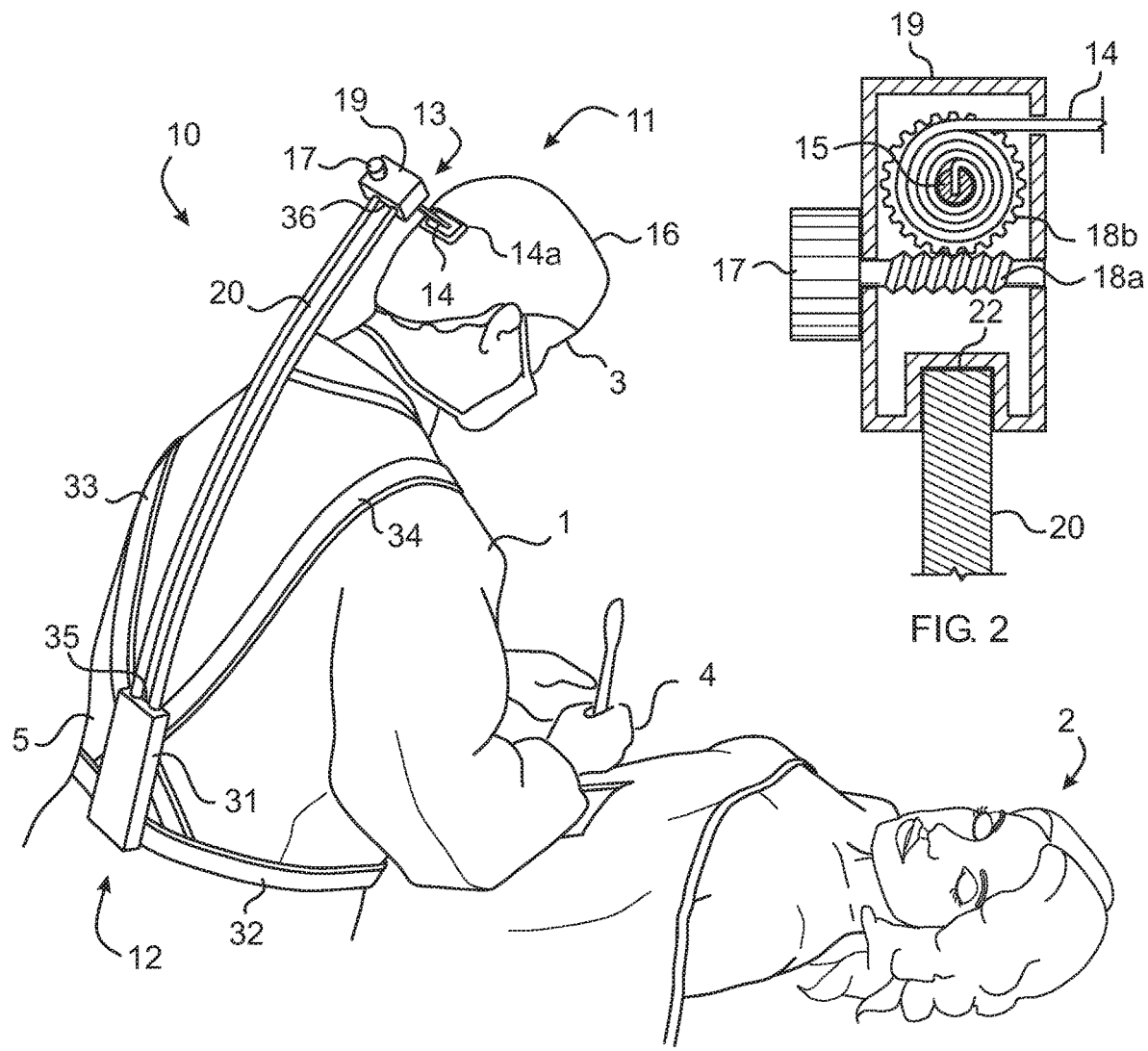
FIG. 1
FIG. 2
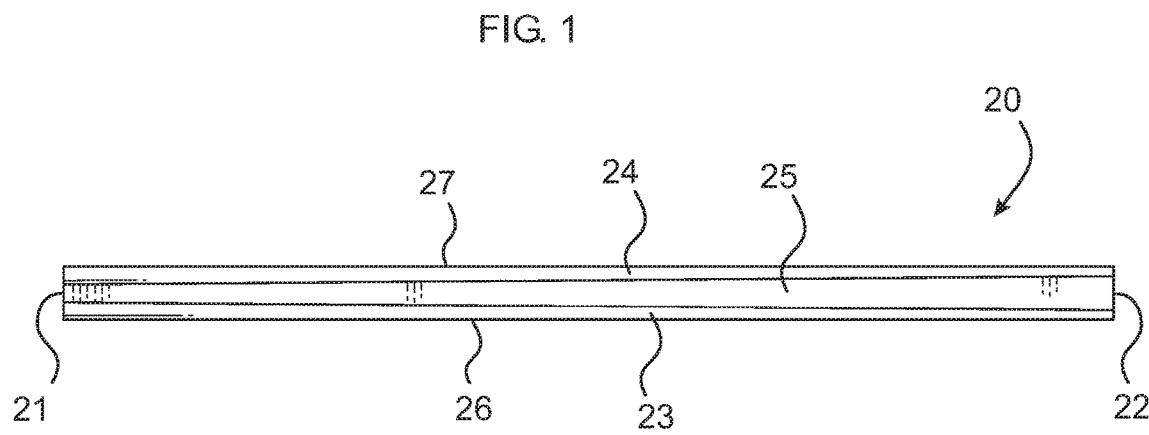
FIG. 3

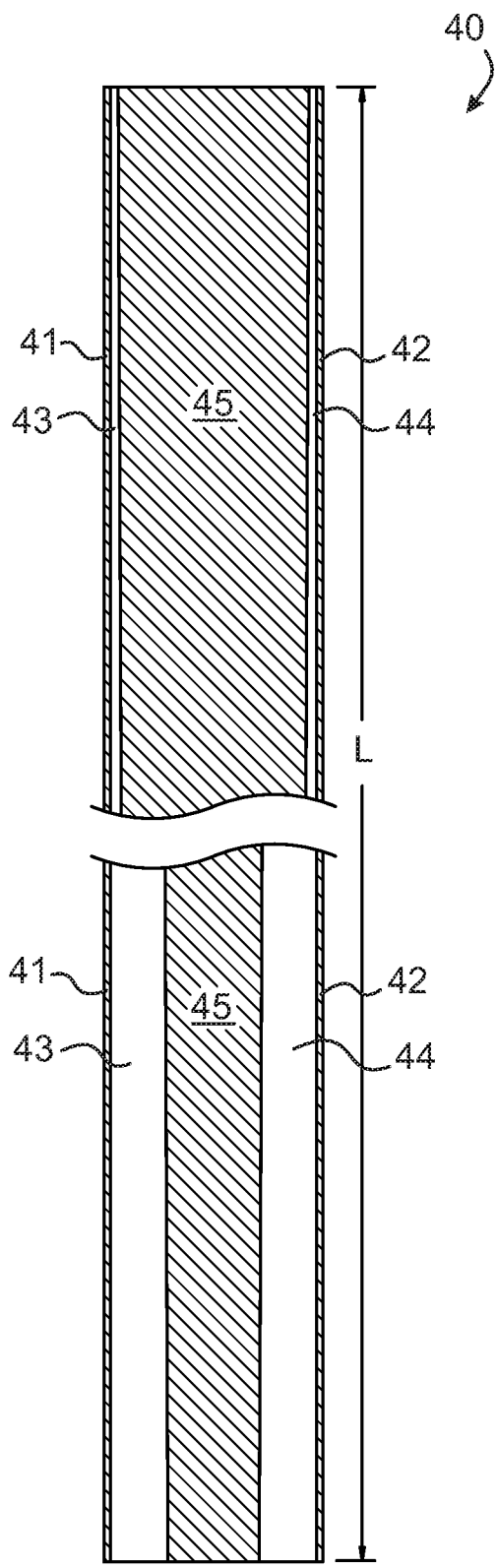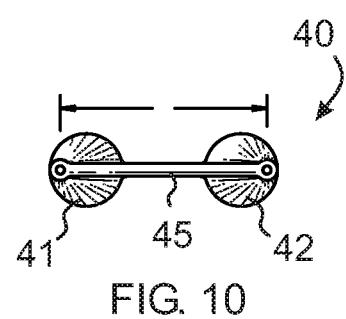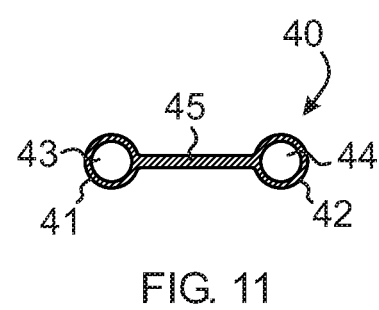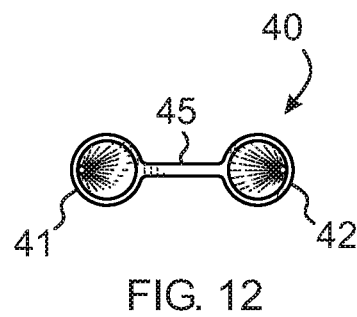
FIG. 9
FIG. 10
FIG. 11
FIG. 12

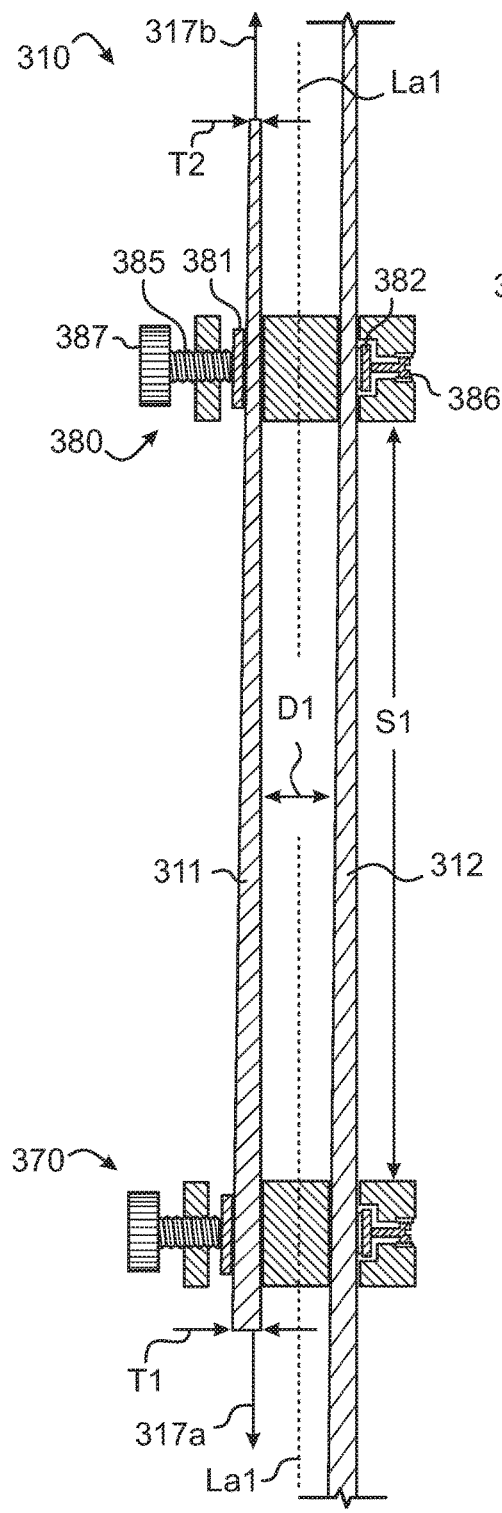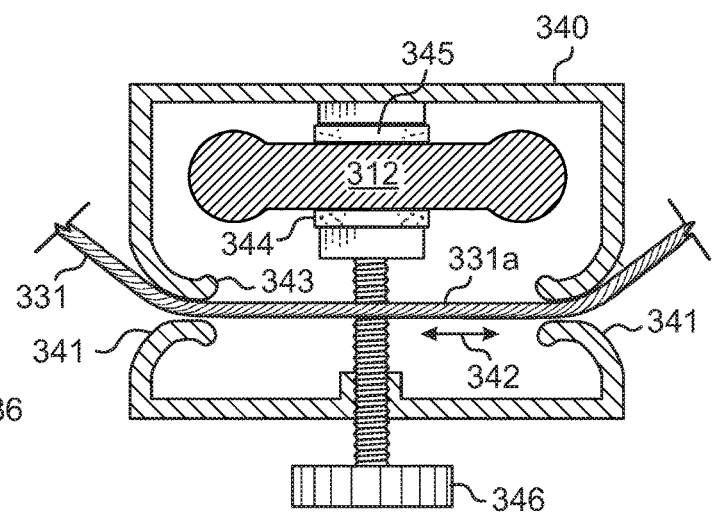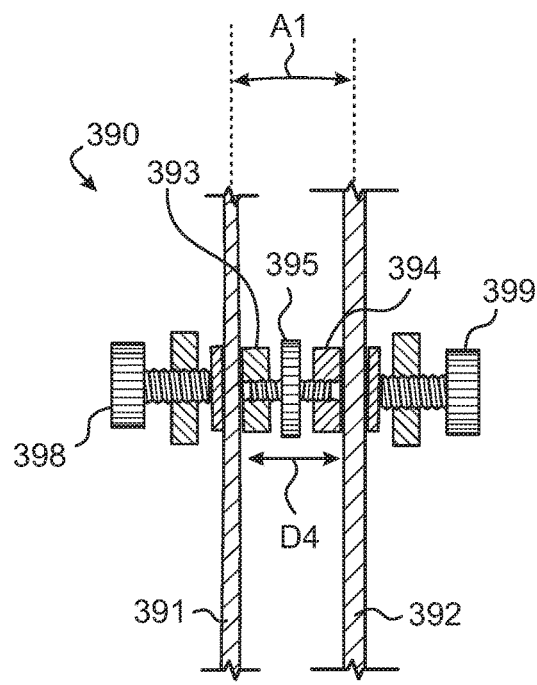
FIG. 29
FIG. 30
FIG. 31

BODY WORN BODY PART SUPPORT DEVICE AND METHOD

PRIOR APPLICATION

This is a continuation-in-part of U.S. patent application Ser. No. 17/166,703, filed 2021 Feb. 3, and is a continuation-in-part of U.S. patent application Ser. No. 16/638,079, filed 2020 Feb. 10, which is a 371 of International Patent Application No. PCT/US2018/046088 filed 2018 Aug. 9, which is a continuation-in-part of U.S. patent application Ser. No. 15/675,515, filed 2017 Aug. 11, now U.S. patent Ser. No. 10/315,745 issued 2019 Jun. 11, all of which are incorporated herein by reference.

FIELD OF THE INVENTION

This invention relates to body worn supports, and more particularly to those supports including a structural member having variable stiffness.

BACKGROUND

Many manual activities require a person to lean forward and look down while performing certain tasks. Many occupations such as surgeons, dentists, technicians, and warehouse workers are required to hold their head suspended while their body is in a leaning or hunched-over position where the neck muscles are in a constant state of flexion. Such leaning positions, when performed repetitively, and over time, impose adverse loading conditions on the human spine. The mass of the head is normally supported by correct alignment of the spinal column in an upright posture. Forward leaning creates compression of anterior spine, muscles, blood vessels and discs. Chronic flexion about the neck can lead to degenerative joint disease and arthritis. It can also lead to tension headaches and para spinous muscle strains.

U.S. Pat. No. 9,072,595 to Grenander, incorporated herein by reference, describes using a spring-biased neck relief device which includes head and body fixation points. This device apparently provides a counteracting tensioning force when the position of the head moves forward beyond a predetermined limit.

One problem with some prior neck support devices that provide only elastic tensioning by a flexible pliable band or spring is that there is very little adjustability for different body types and different amounts of leaning.

Composite materials such as carbon fiber reinforced polymers have long been used to create structural elements due to their low weight and high stiffness/strength to bending moments along the oblong fibers' orientation.

Further, in many prior devices the coefficient of elasticity is nearly constant over the range of motion of the head. Indeed, as the chin moves closer to the chest, the tensioning force increases, thus increasing the load on the anterior neck muscles.

Although such prior semi-rigid support members may provide a superior response to dynamical longitudinal bending moments, they may not exhibit adequate strength and stiffness to dynamical torsional moments. This can be a problem when the cross-section of the member is not angularly uniform and when the support is loosely engaged by its body attachment.

Motorized limb assist devices such as disclosed in Herr et al. U.S. patent Ser. No. 10/485,681 provide exoskeletal assist to the legs for many repetitive activities involving relatively long duration such as running or walking. Such devices may restrict flexibility of the legs and the movement of other parts of the body.

Therefore, there is a need for an apparatus which addresses one or more of the above identified inadequacies.

SUMMARY

The principal and secondary objects of the invention are to provide an improved body-worn, body part support device. These and other objects can be achieved by a pair of spaced apart body harnesses secured to at least one variable stiffness member.

In some embodiments there is provided the combination of a head harness, a torso harness and a variable stiffness beam, wherein the beam comprises at least one fiber reinforced composite structural member which comprises: a pair of substantially parallel, spaced-apart tapering rods, laterally joined by a webbing strip.

In some embodiments there is provided a device for flexibly supporting a body part, said device comprises: an oblong beam having a variable stiffness along a longitudinal length; a first harness secured to a first location on said beam; a second harness secured to a second location on said beam; wherein said first location is longitudinally spaced apart from said second location; wherein said first harness is adapted to secure to a first body part; wherein said second harness is adapted to secure to a second body part; whereby said beam is oriented to carry a load component generated by said first body part when said first harness is secured to said first body part and said second harness is secured to said second body part.

In some embodiments said first harness comprises a connector connecting said first harness to said first location on said beam.

In some embodiments the device further comprises an attachment structure securing said second harness to said second location on said beam.

In some embodiments said beam is oblong and said variable stiffness is variable along a longitudinal length of said beam.

In some embodiments said variable stiffness is adjustable.

In some embodiments said beam comprises a cable extending along a longitudinal length of said beam; whereby said cable being under tension increases a stiffness of said beam.

In some embodiments said cable forms a loop running through a first lumen extending along said longitudinal length and a second lumen laterally spaced apart from said first lumen and extending along said longitudinal length.

In some embodiments said cable runs over at least one pulley located near an end of said beam.

In some embodiments said second harness comprises a body-worn garment.

In some embodiments the device further comprises a resilient cushion adjustably secured to said garment, wherein said cushion contacts a medial portion of said beam.

In some embodiments said device further comprises: a first member having a first oblong shape in a longitudinal direction; said first member having a near end and a far end; a second member having an second oblong shape in said longitudinal direction; said second member having a proximal end and a distal end; wherein said first and second members are spaced apart from each other by a separation distance; a first block connecting said first member to said second member; a second block connecting said first member to said second member; wherein said first and second blocks are longitudinally spaced apart by a spacing.

In some embodiments said second member has a stiffness that is longitudinally variable.

In some embodiments said second member tapers between said proximal end and said distal end.

In some embodiments said second member slides between a first longitudinal position and a second longitudinal position spaced a longitudinal length apart from said first longitudinal position.

In some embodiments said first block comprises a first fastener releasably securing said first block to said second member; and wherein said second block comprises a second fastener releasably securing said second block to said second member.

In some embodiments at least one of said first and second blocks comprises a third fastener releasably securing said at least one of said first and second blocks to said first member.

In some embodiments said first block has a first longitudinal position with respect to said members and wherein said second block has a second longitudinal position with respect to said members, and wherein said first and second longitudinal positions are adjustable.

In some embodiments said separation distance is adjustable.

In some embodiments said spacing is adjustable.

In some embodiments said first block is fixed with respect to said members and wherein said a longitudinal position of said second block is adjustable.

In some embodiments said first harness flexibly and adjustably secures to said beam.

In some embodiments said first harness comprises: a headgear adapted to affix to the head of a wearer; and, a connector connecting said headgear to said first location on said beam.

In some embodiments said first harness further comprises: a housing slidingly mounted to said beam; a cable extending between said housing and said headgear; a guide bracket hingedly connected to said headgear; and, said guide bracket bearing against a portion of said cable.

In some embodiments said first harness further comprises: a spool mounted to said guide bracket adjusting a length of said cable.

In some embodiments said first harness further comprises: a stopping mechanism preventing longitudinal movement of said housing with respect to said beam; said stopping mechanism comprising: a spring-loaded pin mounted to said housing; said pin being shaped and dimensioned to engage a hole in said beam located near an end of said beam.

In some embodiments said beam is secured to said first harness through a connector extending a connector distance between said first harness and said beam, and wherein said connector distance is adjustable.

In some embodiments said connector comprises a releasable lock for fixing said connector distance.

In some embodiments said connector comprises a flexible tether having an adjustable length.

In some embodiments said tether is elastic thereby forming a spring.

In some embodiments said connector comprises a spool upon which is wound a portion of said flexible tether.

In some embodiments said device further comprises: a motor driving said spool; and a microprocessor controlling said motor in response to commands wirelessly received from a computerized mobile device.

In some embodiments said beam is secured to said torso harness by an attachment structure shaped and dimensioned to firmly position a proximal end of said beam.

In some embodiments said attachment structure comprises a pocket and at least one keeper structure engaged by a medial portion of said beam.

In some embodiments said at least one keeper is shaped and dimensioned to loosely engage said beam thereby restricting lateral movement and allowing longitudinal movement of said beam with respect to said torso harness.

In some embodiments said attachment structure comprises a plurality of keeper structures spaced longitudinally apart along a length of said beam, wherein each of said keeper structures is shaped and dimensioned to be loosely engaged by said beam.

In some embodiments said variable stiffness structural beam further comprises: a proximal end and a distal end; said beam having a first cross-sectional area near said proximal end and a second cross-sectional area near said distal end; wherein said first cross-sectional area is larger than said second cross-sectional area.

In some embodiments said variable stiffness structural beam comprises: a pair of substantially parallel, oblong, spaced-apart rods, laterally joined by a webbing strip; wherein each of said rods has a variable cross-sectional geometry along a length of said beam.

In some embodiments each of said pair of rods gradually tapers from said proximal end toward said distal end.

In some embodiments said first one of said pair of rods comprises an axial hollow.

In some embodiments each of said rods have a substantially conical shape.

In some embodiments both of said pair of rods are similarly shaped and dimensioned.

In some embodiments said first cross-sectional geometry is substantially barbell shaped.

In some embodiments said first cross-sectional geometry comprises a pair of spaced apart, interconnected, diametrically symmetric geometric shapes.

In some embodiments said shapes are selected from the group consisting of: circles, ellipses, triangles, squares, rectangles, trapezoids, pentagons, hexagons, heptagons, octagons, nonagons, and decagons.

In some embodiments said first cross-sectional geometry has a width dimension corresponding to said webbing strip, and a height dimension corresponding to an outer diameter of said one of said rods, and wherein said width dimension is equal to or greater than said diameter dimension.

In some embodiments said beam further comprises said beam having a first width dimension at said proximal end and a second width dimension at said distal end; and wherein said first width dimension is equal to or greater than said second width dimension.

In some embodiments said beam is formed by a unitary piece of composite material.

In some embodiments said beam further comprises fiber reinforced material having a first fiber orientation and a second fiber orientation.

In some embodiments said first orientation is rotated substantially 90 degrees with respect to said second fiber orientation.

In some embodiments said beam further comprises fiber reinforced material having a third fiber orientation rotated substantially 45 degrees with respect to said second fiber orientation.

In some embodiments said beam further comprises: a plural number of discrete zones wherein a first of said zones includes a first set of plural fiber orientations, and a second of said zones includes a second set of plural fiber orientations different from said first set of plural fiber orientations.

In some embodiments the device further comprises: a tensioning cable extending along a longitudinal length of said beam and contacting said beam so that an increase in tension in said cable increases a longitudinal stiffness of said beam.

In some embodiments said tensioning cable contacts a first part of said beam near said distal end and a second part of said bean near said proximal end.

In some embodiments there is provided a device for supporting the head, neck, and spine of an individual, said device comprises: a torso harness; a head harness spaced apart from said torso harness; an oblong structural beam mechanically connected to said torso harness and mechanically connected to said head harness; wherein said oblong structural beam exhibits sufficient rigidity to partially counter the force of gravity acting upon the head of the individual.

In some embodiments there is provided a method for supporting a first body part of a person, said method comprises: selecting a support device comprising: a beam having a variable stiffness; a first harness secured to a first location on said beam; a second harness secured to a second location on said beam spaced apart from said first location; attaching said first harness to a first body part of a person; attaching said second harness to a second body part of said person, wherein said second body part is spaced apart from said first body part; changing a load upon said first body part; and, carrying a component of said load on said second body part through said beam.

In some embodiments said method further comprises: adjusting a stiffness of said beam; adjusting a distance between said first location and said first body part; and allowing unrestricted rotational movement of said first body part.

In some embodiments there is provided an adjustable stiffness body worn, body part support device comprises: a beam having a variable stiffness; a first harness securing said body part to said beam; a second harness securing said beam to a location on said body spaced apart from said body part; wherein said beam comprises: a first member having a first oblong shape in a first longitudinal direction; said first member having a near end and a far end; a second member having an second oblong shape in a second longitudinal direction; said second member having a proximal end and a distal end; wherein said first and second members are spaced apart from each other by a separation distance; a first block connecting said first member to said second member; a second block connecting said first member to said second member; wherein said first and second blocks are spaced apart in said first longitudinal direction by a spacing.

In some embodiments said first longitudinal direction and said second longitudinal direction are substantially parallel.

The original text of the original claims is incorporated herein by reference as describing features in some embodiments.

BRIEF DESCRIPTION OF THE DRAWINGS

FIG. 1 is a diagrammatic perspective view of a patient being operated on by a surgeon wearing a body part support device according to an exemplary embodiment of the invention.

FIG. 2 is a diagrammatic cross-sectional side view of the adjustable connector component of the body part support device.

FIG. 3 is a diagrammatic front view of the integrated variable stiffness structural member of the support device of FIG. 1 laid flat.

FIG. 9 is a diagrammatic partial, cross-sectional front view of a fiber reinforced composite integrated variable stiffness structural member having rod lumens according to an alternate exemplary embodiment of the invention.

FIG. 10 is a diagrammatic distal end view of the member of FIG. 9.

FIG. 11 is a diagrammatic cross-sectional end view taken along a medial section of the member of FIG. 9.

FIG. 12 is a diagrammatic proximal end view of the member of FIG. 9.

FIG. 29 is a diagrammatic partial, cross-sectional side view of the adjustable variable stiffness support beam of the body part support device FIG. 28.

FIG. 30 is a diagrammatic cross-sectional top view of the adjustable connector component of the body part support device of FIG. 28.

FIG. 31 is a diagrammatic partial, cross-sectional side view of an adjustable spacing block for a dual member variable stiffness support beam according to an alternate exemplary embodiment of the invention.

DESCRIPTION OF THE EXEMPLARY EMBODIMENTS

Figure 4:
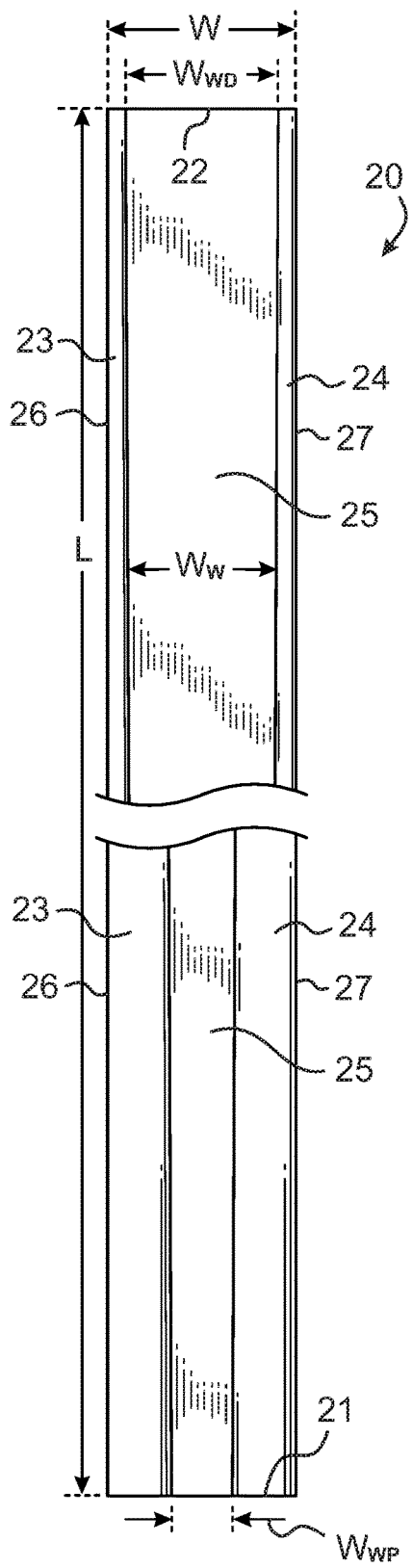
FIG. 4 is a diagrammatic partial elevational front view of the member of FIG. 3.
Figure 5:
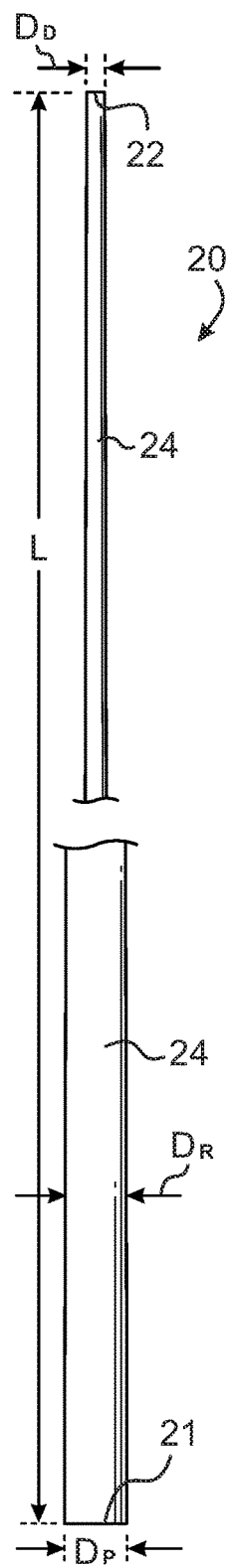
FIG. 5 is a diagrammatic partial elevational side view of the member of FIG. 3.
Figure 6:
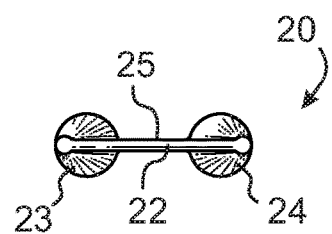
FIG. 6 is a diagrammatic distal end view of the member of FIG. 3.
Figure 7:
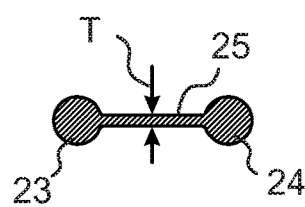
FIG. 7 is a diagrammatic cross-sectional end view taken along a medial section of the member of FIG. 3.

In this specification, the references to top, bottom, upward, downward, upper, lower, vertical, horizontal, sideways, lateral, back, front, proximal, distal, etc. can be used to provide a clear frame of reference for the various structures with respect to other structures usually as oriented in the drawing being referred to. These references should not be treated as absolutes when the frame of reference is changed, such as when the device is inverted, shown on its side, or disassembled.

If used in this specification, the term "substantially" can be used with respect to manufacturing imprecision and inaccuracies that can lead to non-symmetricity and other inexactitudes in the shape, dimensioning, orientation, and positioning of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes, such as cylinders, disks and cones, and their orientations, while providing adequately similar function. Those skilled in the art will readily appreciate the degree to which a departure can be made from the mathematically exact geometrical references.

If used in this specification, the word "axial" is meant to refer to directions, movement, or forces acting substantially parallel with or along a respective axis, and not to refer to rotational nor radial nor angular directions, movement or forces, nor torsional forces.

In this specification the units "millimeter" or "millimeters" can be abbreviated "mm", "centimeter" or "centimeters" can be abbreviated "cm".

In this specification reference may be made to the use of numerous patches or layers of hook-and-vane fabric fastener such as VELCRO brand fastener available from Velcro USA Inc. of Manchester, New Hampshire in which a patch of hook-and-vane fabric fastener of a first type (either hook or vane) can releasably fasten to a patch of the opposite type. For example a patch of the hook type would releasably bond to a patch of the vane type or some other common, loosely woven fabrics. For clarity such fasteners are referred to in this specification as fabric fasteners, and a patch of fabric fastener will bond to a corresponding patch of fabric fastener. Those skilled in the art will readily appreciate which type will best be used for any given patch and whether the type of matable patches can be swapped.

Referring now to the drawing, there is shown in FIGS. 1-2 an embodiment of a variable stiffness support device for supporting a body part of wearer, which is in this case a surgeon 1 operating on a patient 2. The patient is supported in a supine position upon an operating table raised off the ground to about the waist level of the standing surgeon. The surgeon is performing an operation on the patient in a hunched over posture where the head 3 of the surgeon is temporarily and repeatedly cantilevered out over the patient so that the surgeon can closely observe the actions of his hands 4. In this position, the posterior neck and back muscles of the surgeon can rapidly fatigue.

In some embodiments including this one, the surgeon, referred to as a user or wearer 1, can wear a body part support device 10 which provides a first harness 11 secured to a first body part which in this embodiment is the head 3, and a second harness 12, spaced apart from the first harness, secured to a second body part which in this embodiment is the lower back region 5 of the torso. Thus, in this embodiment the first harness can be referred to as the head harness 11 and the second harness as the torso harness 12. The head harness can be separate and spaced apart from the torso harness. A variable stiffness structural beam can be formed by a single, oblong, variable stiffness structural member 20 secured at a first location 36, near its distal end, to the head harness 11, and can be secured at a second location 35, near its proximal end, to the torso harness 12. All of the structures used in the device can be made from materials that can be surgically sterile.

The head harness 11 can include headgear 16 in the form of a helmet-like apparatus that firmly secures to the wearer's head 3 and thus remains substantially stationary with respect to the head. A connector 13 can secure the headgear to the first location 36 of the member 20. Thus, the connector can be a component of the head harness and a component of the body part support device 10. The connector can include a tether 14 of flexible material wound upon a spindle 15 rotatably mounted in a housing 19 attached to the member. The free end of the tether can be secured to the headgear at a landing 14*a* which can include a rapidly actuated fastener to allow for rapid coupling and decoupling of the headgear from the device. For example, the landing can include a patch of fabric fastener which detachably bonds to a corresponding patch affixed to an outer surface of the headgear. In some embodiments the tether can be made from materials which allow it to be elastic thereby forming a spring.

As shown primarily in FIG. 2, the distance between the headgear 16 and the member 20 can be adjusted by adjusting the amount of the tether 14 wound upon the spindle 15, which can be accomplished by rotating a knob 17 driving a worm gear 18*a* engaging a sprocket 18*b* driving the rotation of the spindle. By using a sprocket and worm gear, the amount of tether wound upon the spindle can be substantially locked when the knob is at rest, even when the tether is under tension. In this way the head harness 11 can flexibly and adjustably secure to the member 20.

Referring back to FIG. 1, the torso harness 12 can include an attachment structure for attaching the second location 35 near the proximal end of the member 20 to the wearer near the base of the spine, thus firmly securing a position of the proximal end of the member. The attachment structure can include a base 31 to which the proximal end of the member 20 can be firmly secured. The base can form a substantially stationary connection point secured near the lower back of the wearer. The torso harness can also include a waistbelt 32 and a pair of shoulder straps 33,34 for tightly and adjustably securing the torso harness to the wearer 1.

FIG. 3 shows the member 20 in the present embodiment removed from the support device and laid flat. The member can be similar in shape to the sail batten disclosed in Malcolm, U.S. patent Ser. No. 10/315,745 incorporated herein by reference. The member can have an oblong, substantially rectangular shape extending from a proximal end 21, which can be to be secured to the torso, to an opposite distal end 22, which can be secured to the head. The member can include a pair of substantially parallel, oblong, spaced-apart, tapering rods 23,24, laterally joined by a medial webbing strip 25. In this way the a proximal portion of the member can have greater stiffness to bending and torsional forces than a more distal portion. The mechanical characteristics of the member will be described in greater detail below.

Referring now primarily to FIGS. 4-8, the member 20 can include a pair of substantially parallel, oblong, laterally spaced apart rods 23,24 forming the opposite lateral edges 26,27 of the member and extending along substantially the entire longitudinal length L of the member from the proximal end 21 to the distal end 22. Each of the rods can have a substantially conical shape having a substantially circular cross-section where the diameter $D_R$ varies according to its longitudinal position on the member, gently and gradually tapering from a wider proximal diameter $D_P$ to a narrower distal diameter $D_D$. The substantially conical shape can be characterized by a ratio between these two diameters $D_D/D_P$ which ranges from between about 0.05 to 0.5. This provides a substantially linear taper along the length of the rods. The substantially conical shape can be an oblique circular cone so that cross-sections perpendicular to the elongation axis of the member form circles. Alternately, the substantially conical shape can be a right circular cone where cross-sections perpendicular to the elongation axis of the member form ellipses, albeit ones with very low eccentricity. The term "substantially" is used to cover both of these variations and other uniformly tapering geometries. In this way, each of the rods can have a variable cross-sectional geometry along the longitudinal length L of the member.

The rods 23,24 can be interconnected by a medial webbing strip 25 having generally parallel trapezoidal front and back surfaces. Thus, the webbing strip can be substantially planar, having a substantially uniform thickness T along the entire longitudinal length of the member.

The rods can be angled outwardly so that the lateral extent of the member remains substantially uniform. In other words, the overall width W of the member can remain constant. This can cause the width of the webbing strip $W_w$ to vary between a narrower width $W_{wp}$ at the proximal end of the member to a wider width $W_{wd}$ at the distal end of the member. Thus the overall width of the member can be defined as $W=W_w+2(Dr)$.

Figure 8:
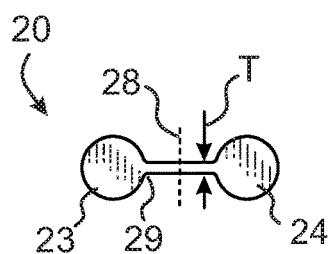
FIG. 8 is a diagrammatic proximal end view of the member of FIG. 3.

Referring now to FIG. 8, by making both rods 23,24 substantially identically shaped and dimensioned, the member 20 can be made to be symmetric about a plane 28 perpendicularly bisecting the webbing strip 25. In this way, the symmetrical member can be conveniently loaded in the support device without regard to whether which rod is located on the left or right side of the device. It shall be noted that the transition between each rod and webbing strip can be gradual in the form of a concave fillet 29 having a radius of between approximately 5% to 25% of the cross-sectional diameter of the rod at the point of contact with the fillet. Although the member is shown having a barbell-shaped cross-section where the rods form a pair of circles, other shapes are available, such as for example, ellipses, rounded squares, rounded rectangles ovals, or other polygons having rounded vertices.

Referring now to FIGS. 9-12, there is shown an alternate embodiment of a variable stiffness structural member 40 which can be further adapted so that the rods 41,42 are hollow, each having an axial hollow in the form of a central lumen 43,44 extending longitudinally the length of the respective rod. The medial webbing strip 45 interconnecting the rods can remain solid. The shape and dimensioning of the lumen can be selected so that the wall formed between the outer surface of the rod and the inner surface facing the lumen is ring-shaped having a circular outer surface cross-section and a circular inner surface cross-section. The wall thickness can thus be angularly uniform at every cross-section and linearly uniform from end to end. The lumen can terminate in apertures at the distal and proximal ends. Alternately, the lumens can terminate in a closed cup at the distal extremity of the lumen. The lumens can serve to reduce the mass and amount of material contained in the member while maintaining adequate bending and torsional stiffness and strength.

The stiffness properties of the member can be adjusted by forming the member from fiber-resin composite materials such as a carbon-fiber epoxy resin composite. The uncured epoxy can be combined with carbon fibers using techniques well known in the art. In this example, a thermosetting preimpregnated resin tape or "prepreg" can be used, such as unidirectional fiber tape available from American Cyanamid Co. of Wayne, New Jersey Layers of the tape can be successively wrapped onto one another to form into an uncured member body corresponding to the desired size of the member. Once cured, the body becomes the unitary fiber composite variable stiffness structural member.

The orientation of the fibers can be selected to enhance stiffness with respect to bending moments apart from the elongation direction of the member.

Figure 13:
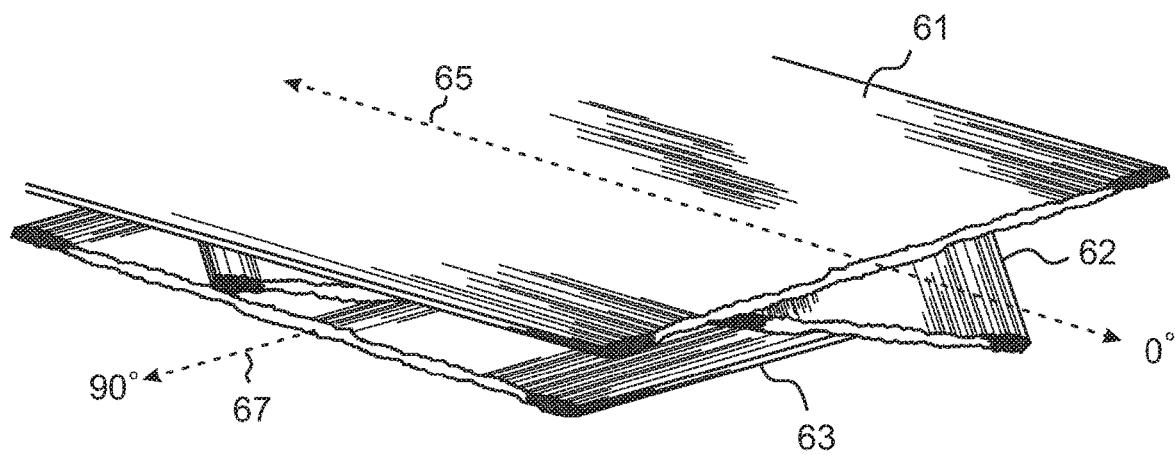
FIG. 13 is a diagrammatic partial perspective view of fiber composite layers having differential orientations.
Figure 14:
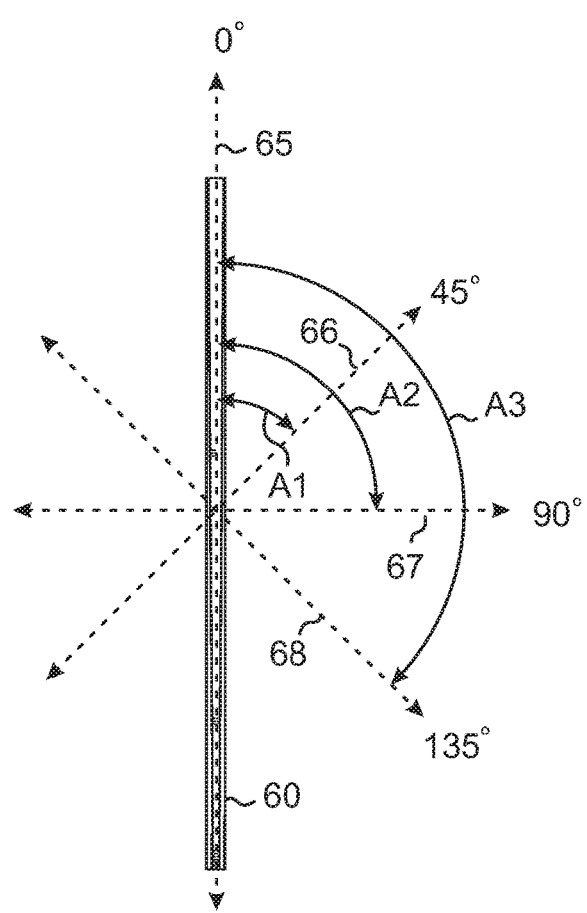
FIG. 14 is a diagrammatic top view of a fiber composite member showing the variously selected fiber orientations.

As shown diagrammatically in FIGS. 13 and 14, successive layers 61,62,63 of tape can be applied where the direction of fibers in each layer are different from the direction of fibers in each successive layer to adjust stiffness properties to forces applied from various directions and magnitudes over time. For example, a first layer 61, can be oriented at 0 degrees so that the elongation direction of the embedded fibers are parallel with the elongation axis 65 of the member 60. A second layer 62, can be oriented so that the elongation direction 66 of the embedded fibers are at an angle A1 of about 45 degrees with respect to the elongation axis of the member. Similarly, a third layer 63, can be oriented so that the elongation direction 67 of the embedded fibers are at an angle A2 of about 90 degrees with respect to the elongation axis of the member. A fourth layer, can be oriented so that the elongation direction 68 of the embedded fibers are at an angle A3 of about 135 degrees with respect to the elongation axis of the member.

Figure 15:
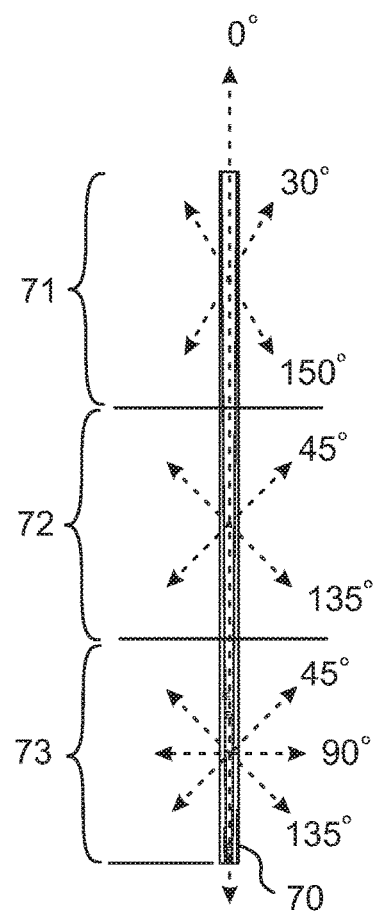
FIG. 15 is a diagrammatic top view of a fiber composite member showing plural zones of variously selected fiber orientations.

Referring now to FIG. 15, the structural member can be divided into a plural number of zones where the fiber orientation of the various layers within the zone can be different from the orientations on other zones in order to selectively and preferentially rigidize the different zones of the member differently. By way of example, the member 70 can be divided longitudinally into three discrete zones 71,72,73 where the first distal zone 71 can have a set of fiber layers oriented in the 0 degree direction and in the 30 degree and 150 degree directions. A second medial zone 72 can have a set of fiber layers oriented in the 0 degree direction and in the 45 degree and 135 degree directions. A third proximal zone 73 can have a set of fiber layers oriented in the 0 degree direction and in the 45 degree, 90 degree, and 135 degree directions. Thus, the set of fiber layers in a particular zone results in that set having a plural number of different fiber orientations. Further, plural fiber orientations of one set are different from the plural fiber orientations of another set. These differential fiber orientation sets combined over the length of the member will preferentially rigidize the proximal zone to greater bending and torsional loads than the distal zone. In this way, it the member can be a multidimensionally reinforced fiber composite which can provide lightweight stiffening. Further, in the context of a head and neck support device these differential fiber orientations can allow the spring rate, or deflection force, to vary along the length of the member to mimic the size and strength of the spinal column.

Figure 16:
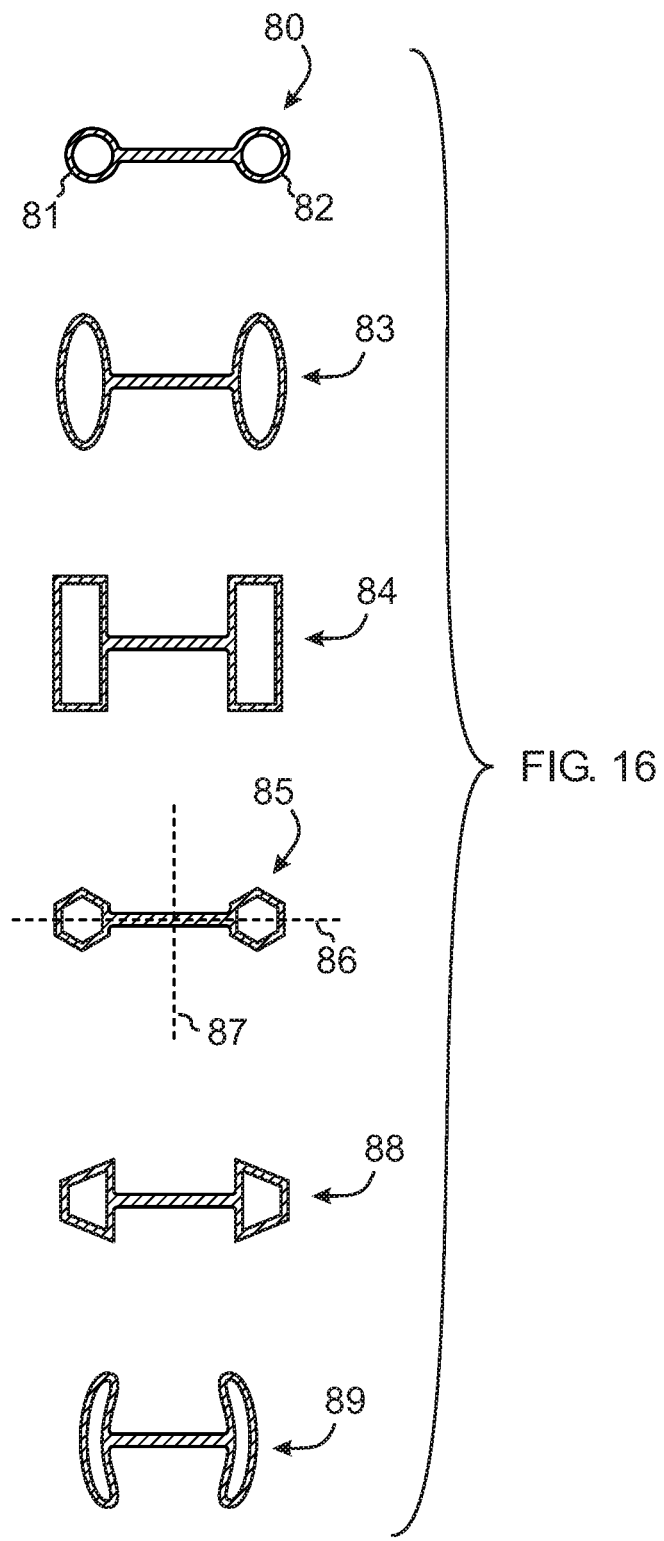
FIG. 16 is a diagrammatic cross-sectional views of various rod geometries.

Referring now to FIG. 16, as previously shown, the cross-sectional shape of the member 80 can include rods 81,82 having a substantially circular shape. However, other shapes may be useful for other structural members depending on the application for which the members are used, and due to manufacturing concerns. For example, the rods can have an elliptical shape 83, or a quadrangular shape, including squares and rectangles 84. Rods having other diametrically symmetrical polygonal shapes such as hexagons 85, octagons, and decagons can be used to provide a member cross section which is symmetric about the side-to-side transverse axis 86, and the front-to-back transverse axis 88. Other shapes can be used which are diametrically symmetric depending on orientation such as trapezoids 88, pentagons, and heptagons. Myriad other more complex shapes which provide symmetricity with respect to both transverse axes are available such as substantially half-moon shapes 89. For most applications such symmetricity is preferred in order to ease manufacturing, maintenance, and adjustment of the body part support device. However, non-symmetric rod cross-sections can be used depending on the application.

Figure 18:
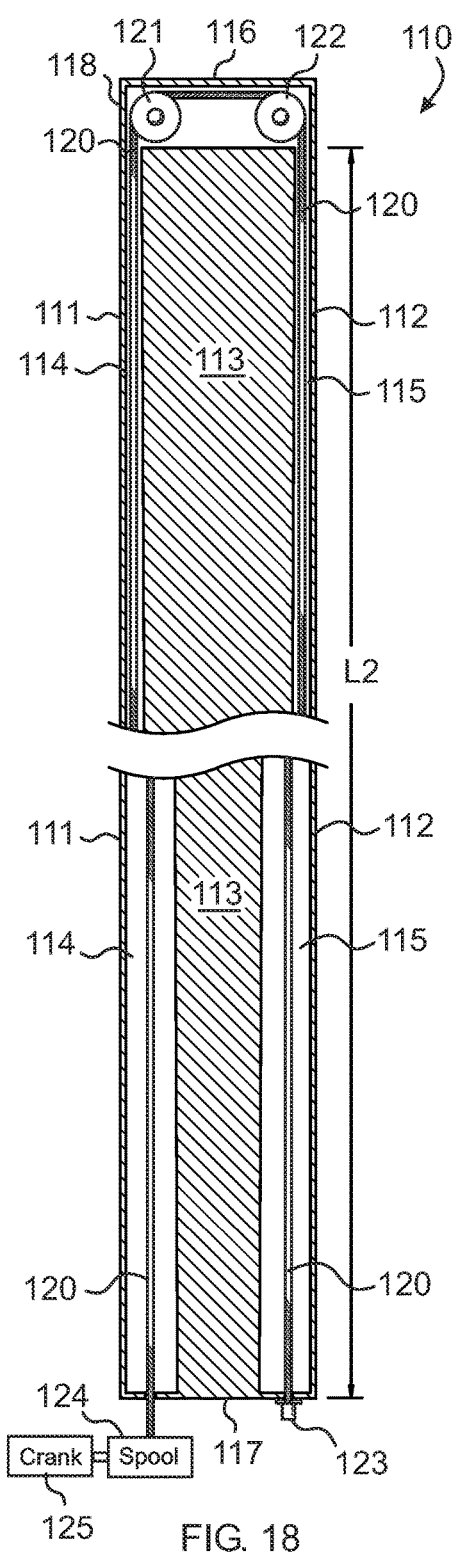
FIG. 18 is a diagrammatic partial, cross-sectional front view of the adjustable variable stiffness structural member of the body part support device of FIG. 17.
Figure 17:
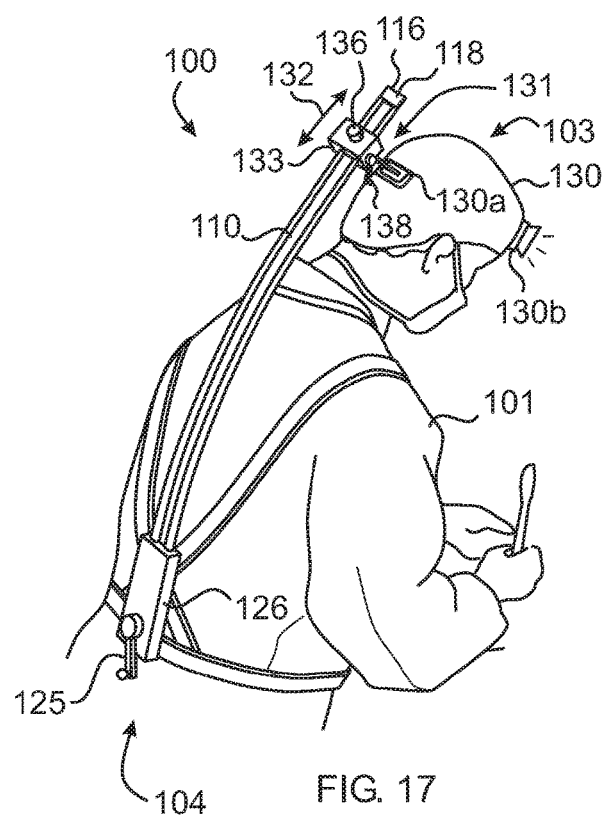
FIG. 17 is a diagrammatic perspective view of a surgeon wearing a body part support device having adjustable variable stiffness structural member according to an alternate exemplary embodiment of the invention.
Figure 19:
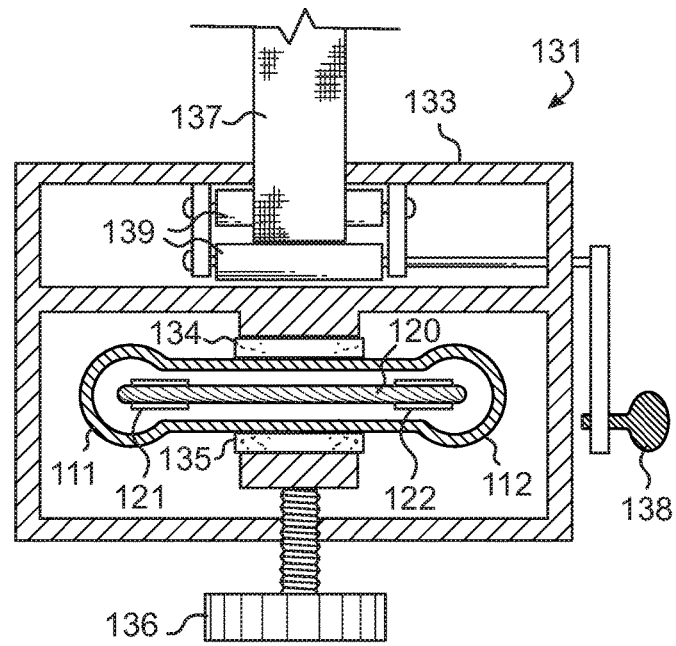
FIG. 19 is a diagrammatic cross-sectional top view of the adjustable connector component of the body part support device of FIG. 17.

Referring now to FIGS. 17-19, there is shown an alternate embodiment of a body part support device 100 similar to the one described above in connection with FIG. 1 but with some important differences. In some embodiments including this one, the device can provide a variable stiffness structural beam which can be formed by a single variable stiffness structural member 110 having adjustable rigidity and provide a mechanism for adjusting the location where at least one of the harnesses connects to the member. The device can include a head harness 103 and a torso harness 104 secured to a wearer 101 secured to spaced apart locations on the member.

The variable stiffness structural member 110 can be similar to the embodiment of the member shown in FIG. 9 but with some important differences. The member can include a pair of substantially parallel, oblong, laterally spaced apart, tapering rods 111,112 interconnected by a medial webbing strip 113. Each of the rods can be hollow having central longitudinal lumen 114,115 running the length L2 of the respective rod. A loop of tensioning cable 120 can run through both lumens and over a pair of pulleys 121,122 located near the distal end 116 of the member. A first end 123 of the cable can be fixed near the proximal end of one of the lumens 115 while a second end of the cable can be wound upon a spool 124 near the proximal end of the other lumen 114. A locking crank 125 can be used to adjust the tension on the cable. The spool and locking crank mechanism can be housed in a housing 126 at the base of the torso harness to which the proximal end 117 of the member can be firmly secured. In this way, the tensioning cable can extend along a longitudinal length of the beam and contact the beam in such a way that an increase in tension in the cable causes an increase in the longitudinal stiffness of the beam.

The head harness 103 can include headgear 130 similar to the embodiment of FIG. 1. In some embodiments including this one, the headgear can also provide a mount 130b for a lamp, magnifying lenses, a display screen, or other items useful to the operation being undertaken by the wearer. A connector 131 can secure the headgear to a location on the member 110. That location can be adjusted by longitudinally moving 132 a housing 133 along the member. The location of the housing on the member can be locked by a pair of resilient oppositely engaging pressure pads 134,135 whose spacing is adjusted by turning of a threaded knob 136. In this way the housing can provide a connection between the member and the headgear.

Similar to the embodiment of FIG. 1, the connector can include a tether 137 of flexible material having a free end secured to the headgear at a landing 130a. The length of the tether can be adjusted by rotating a crank 138 which drives a pair of pinch rollers 139 located in the housing 133 that retain the tether. Gearing (not shown) can ensure that the pinch rollers remain locked in place unless the crank is moved.

It shall be noted that the pulleys 121,122 can be mounted within an enclosure 118 located near the distal end 116 of the member 110. The enclosure can have a cross-sectional shape and dimension which can prevent the connector housing 133 from accidentally moving beyond the distal end of the member during longitudinal adjust of the connector housing position.

It shall be understood that some or all of the components involving the use of hand-actuated knobs and cranks can be driven by motors. Further, it shall be understood that the variable stiffness structural member can derive its stiffness variability from static structural differences in different parts of the member, as shown in the embodiment of FIG. 1, or through adjustable structures such as the tensioning cable shown in the present embodiment, or both. Further, the adjustable structures can be adjusted dynamically by servo motors or other actuators during use to provide continuous or intermittent adjustment of the variable stiffness.

Figure 20:
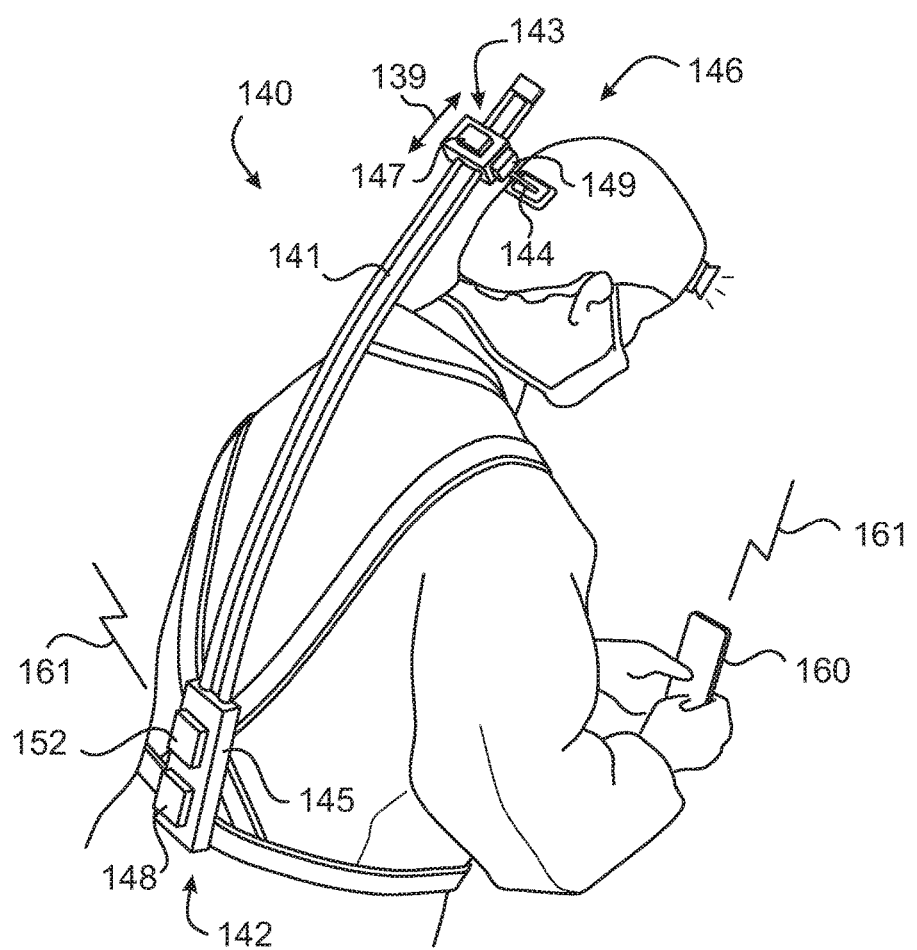
FIG. 20 is a diagrammatic perspective view of a surgeon wearing a body part support device having adjustable variable stiffness and computerized parameter tracking according to an alternate exemplary embodiment of the invention.

Referring now to FIG. 20, there is shown an alternate embodiment of a body part support device 140 similar to the one described above in connection with the embodiment of FIG. 17 but with some important differences. In some embodiments including this one, hand-manipulable cranks and knobs have been replaced with a number of electrically activated servo motors. An electric motor 148 can be mounted to a housing 145 securing the proximal end of a variable stiffness structural member 141 to a torso harness 142. The motor 148 can engage a spool upon which is wound an internal cable running through lumens in laterally spaced apart rods of the member. Operation of the motor can adjust the tension on the cable and thus adjust the stiffness of the member. The motor can be powered by a battery carried in the base housing 145 of the torso harness 142, and controlled by microprocessor circuitry 152 installed in the base. A smartphone 160 or other computer can direct operation of the microprocessor circuitry through a wireless communication link 161 using standard wireless communication regimes such WiFi, Bluetooth or other well-known regimes and protocols.

Similarly, in the head harness 146, a motor 149 can replace the crank 131 used in the embodiment of FIG. 17. In this way, operation of the motor 149 can adjust the length of the flexible tether 144 in the connector 143 securing the headgear to the member 141. The motor 149 can be controlled by the microprocessor 152. Another motor 147 can drive adjust the longitudinal position 139 of the housing. In this way, sensors such as accelerometers, tensiometers, and/or sensors within the head harness can detect changes in the position of the head and move the housing dynamically and/or shorten or lengthen the flexible tether to maintain support without binding or impeding required movements of the head and neck. Signals and power can be supplied to the motors as will be described below.

Figure 21:
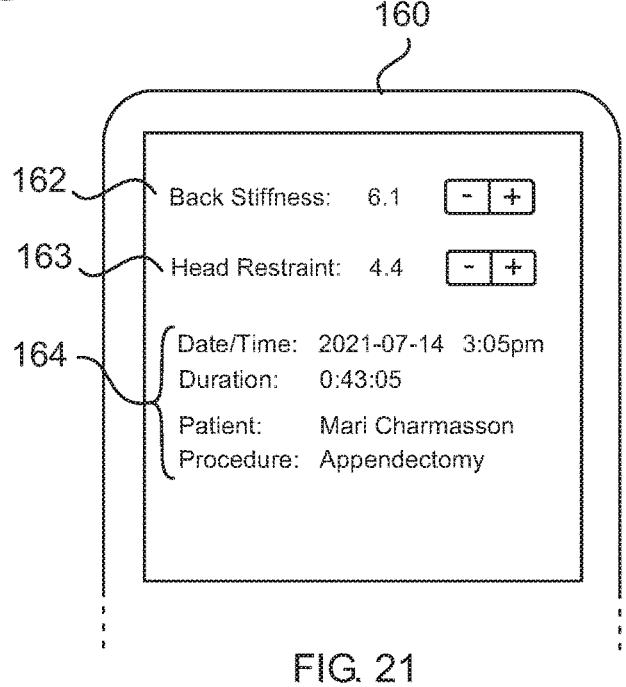
FIG. 21 is a diagrammatic partial front view of the display of a personal mobile device for controlling and tracking parameters the body part support device of FIG. 20.

Referring now primarily to FIG. 21, in addition to controlling the motors 147, 148, 149, or programming the control of the motors in response to any on-board sensors of the support device 140, the smartphone 160 or computer can run an app or other software routines that issue operational commands, track various parameters associated with the status of the support device, and access databases relevant to the operation of the support device, such as member stiffness settings 162, tether length settings 163, and maintain a record of those parameters so that different users can rapidly load preferred configurations. The databases can be carried on board the computer, or accessed through a wirelessly connected computer network such as the Internet. It shall be understood that various sensors such as orientation sensors, strain gauges, or other electronic sensors can be mounted on the support device and supply signals indicating the status of these parameters which are utilized by the microprocessor and/or software routines during operation. The routines can also track and display various information 164 including the date and time, duration of current activity, and patient information including name and the procedure being performed, for example, thereby enhancing patient safety.

Figure 22:
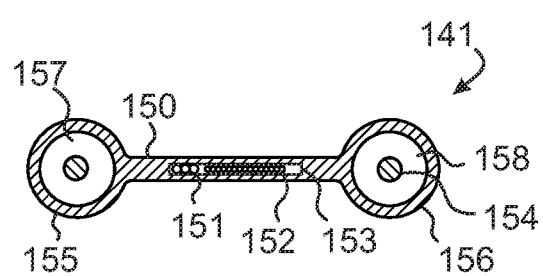
FIG. 22 is a diagrammatic cross-sectional end view taken along a medial section of the variable stiffness structural member of the body part support device of FIG. 20.

Referring now to FIG. 22, electrical power and communication signals can be carried on wiring 151,152 running through a channel 153 formed into the webbing portion 150 of the member 141. In this way, a relatively heavy and bulky battery power supply, and control unit can be carried on the base 145 of the torso harness 142 and supply electrical power, and deliver and receive electrical signals to and from the head harness 146. Further the electrical power and signals can be carried on the member without mechanical interference with the cable 154, rods 155,156, and lumens 157,158 of the member. A ribbon cable or other movable electrical signal-carrying device can provide an electrical connection between the member and the connector 143 of the head harness. Alternately, wireless communication circuitry can be employed for communication between either harness 142,146 and the smartphone 160 or other computerized mobile device.

Figure 23:
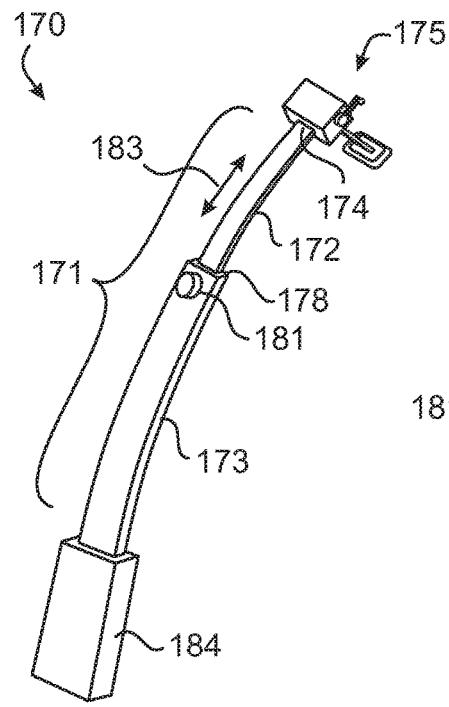
FIG. 23 is a diagrammatic partial perspective view of a body part support device having a length adjustable variable stiffness support beam according to an alternate exemplary embodiment of the invention.
Figure 24:
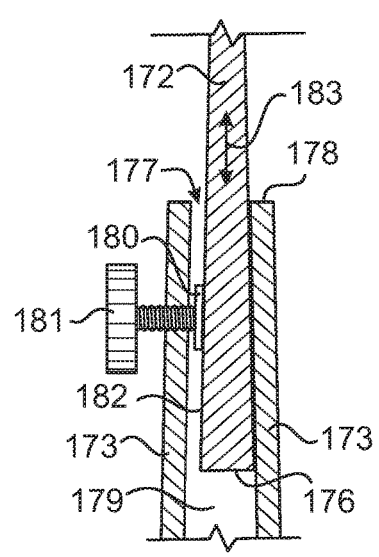
FIG. 24 is a diagrammatic partial cross sectional side view of the adjustment mechanism for the adjustable support beam of FIG. 23.

Referring now to FIGS. 23-24, there is shown an alternate embodiment of a body part support device 170 similar to the one described above in connection with the embodiment of FIG. 1 but with some important differences. In some embodiments including this one, a variable stiffness structural beam 171 can include a mated pair of telescopingly engaged members 172,173. The first distal member 172 can have a distal end 174 secured and fixed with respect to a connector 175 for a head harness, and a proximal end 176 slidingly engaging an aperture 177 in the distal end 178 of the proximal member 173 that leads to a passageway 179 extending longitudinally within the proximal member from the aperture toward the proximal end of the proximal member secured and fixed with respect to a base 184 of the torso harness. This allows the distal member to move longitudinally 183 with respect to the proximal member. The position of the distal member with respect to the proximal member can be locked by a friction pad 180 bearing against a surface 182 of the distal member. The amount of friction imparted by the pad can be adjusted by a threaded knob 181. In this way the longitudinal position of the head harness can be adjusted with respect to the torso harness. Both members can taper from their proximal ends toward their distal ends resulting in a substantially trapezoidal cross-section as shown in FIG. 24. In this way each of the members can have a variable stiffness along their longitudinal length. Further the stiffness of the beam 171 can be made adjustable through relative movement of the two members.

Figure 25:
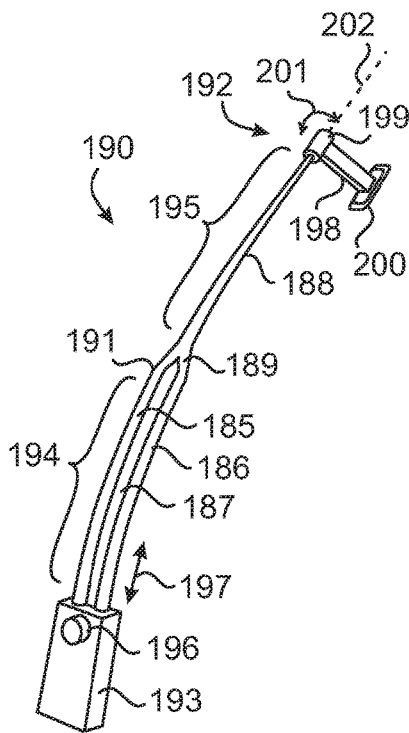
FIG. 25 is a diagrammatic partial perspective view of a body part support device having a support beam providing reduced torsional rigidity according to an alternate exemplary embodiment of the invention.

Referring now to FIG. 25, there is shown an alternate embodiment of a body part support device 190 partially similar to the one described above in connection with the embodiment of FIG. 1 including a variable stiffness structural beam, which in some embodiments including this one can be formed by a single variable stiffness structural member 191 secured at a distal end to a head harness connector 192 and at a proximal end to a torso harness base 193. However, there are some important differences with the embodiment of FIG. 1. In some embodiments including this one, the device can provide a mechanism for adjusting the location where the torso harness connects to the member, provide reduced torsional rigidity, and provide greater resistance to longitudinal loads.

The member 191 can include a first longitudinally proximal region 194 and a second longitudinally distal region 195. The proximal region 194 can include a pair of laterally spaced apart rods 185,186 joined by a medial web 187. The rods can optionally taper as they extend distally, similar to the rods in the embodiment of FIG. 1. The distal region 195 can include a single rod 188 that can optionally taper as it extends distally toward a distal end secured to the head harness connector 192. A transition region 189 joins the proximal region to the distal region. When manufacturing the member to be a unitary integrated piece of composite material, the transition region can be design to gradually morph in shape between the shape of the proximal region and the shape of the distal region. The single rod of the distal region can form a delta which separates into two rods which become the dual rods of the proximal region.

The device 190 can include a mechanism, similar to that shown in connection with the embodiment of FIG. 24, which can allow adjustment in the longitudinal position of the member 191 with respect to the torso harness base 193 by allowing a telescoping longitudinal movement 197 between the member and the base. The relative position of the member can be fixed by a friction pad driven by a threaded knob 196 mounted to the torso harness base.

The head harness connector 192 can include a rigid strut 198 extending between a housing 199 attached to the member 191 near its distal end, and a landing 200 secured to a headgear (not shown) similar to the embodiment of FIG. 1. The attachment of the strut to the housing and landing can be rigid. In this way, the head harness connector can provide greater resistance to longitudinal loads. The housing 199 can have a swivelling connection to the member which allows for angular movement 201 of the strut about the longitudinal axis 202 of the distal end of the member in order to reduce torsional rigidity. The structure of the rigid strut, rigidly attached to the housing and landing of the headgear provides cantilevered support to the headgear and thus the head and neck of the wearer.

Figure 26:
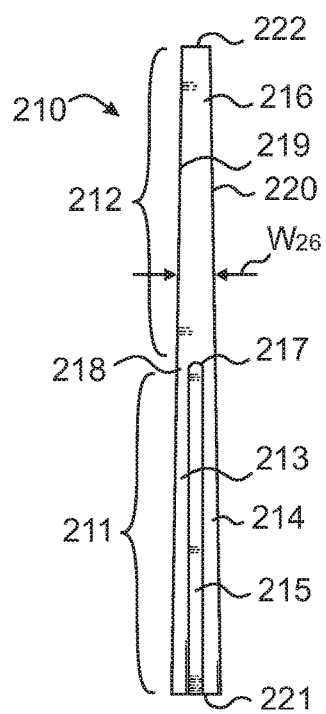
FIG. 26 is a diagrammatic top view of a support beam providing a support member according to an alternate exemplary embodiment of the invention.

FIG. 26 shows an alternate embodiment of a variable stiffness structural member 210 similar to the member described in connection with the embodiment of FIG. 25, but with some important differences which provide a smoother shape to avoid snags as the wearer moves about equipment in an operating room for example. In some embodiments including this one, the member can include a first longitudinally proximal region 211 and a second longitudinally distal region 212. The proximal region 211 can include a pair of laterally spaced apart rods 213,214 joined by a medial web 215. The rods can optionally taper as they extend distally, similar to the rods in the embodiment of FIG. 1. The distal region 212 can include a single rod 216 that can optionally taper as it extends distally toward a distal end 222. The single rod can have a substantially oval cross-section taken perpendicular to the longitudinal axis of the member. The medial web can terminate in a distal rounded terminus 217 at transition region 218 where the proximal region and distal region meet.

In some embodiments including this one, the width $W_{26}$ of the member 210 can taper substantially linearly from a proximal end 221 to a distal end 222 so that the lateral edges 219,220 of the member maintain a smooth contour and thereby avoid snags. It shall be noted that the width of the member can remain constant while the thickness of the member, measured orthogonally to the width, can taper from the proximal end to the distal end to provide adequate variable longitudinal stiffness to the member.

Figure 27:
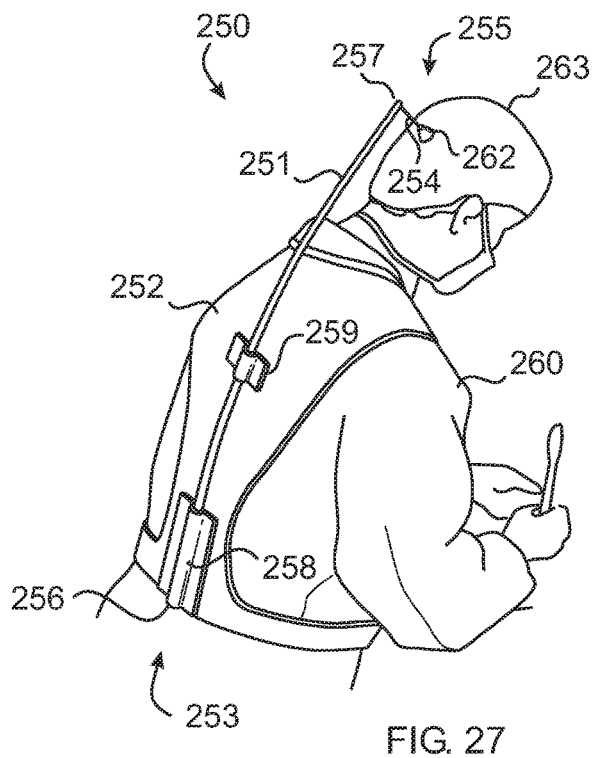
FIG. 27 is a diagrammatic perspective view of a surgeon wearing a body part support device having simplified variable stiffness support member according to an alternate exemplary embodiment of the invention.

Referring now to FIG. 27, there is shown an alternate embodiment of a body part support device 250 similar to the one described above in connection with the embodiment of FIG. 1 but with some important differences. In some embodiments including this one, the variable stiffness structural beam can be formed by a single variable stiffness structural member 251 which can be made from a single tapering rod secured to a garment 252 in the form of a fabric vest forming the torso harness 253. A simplified flexible cord connector 254 can be used in forming the head harness 255 in order to minimize complexity and weight. The member can be made from a unitary piece of carbon-fiber composite, to form a semi-rigid rod that tapers from a proximal end 256 to a distal end 257.

The garment 252 can be constructed of a tough, lightweight, breathable, non-stretch material having elastomeric panels and zones to accommodate movement where required while controlling position of the body part support device. Various adjustment and cinch straps may be added where needed for sizing to different users. The garment may be of a jacket or vest type. The garment may include ventilation features, active cooling and heating features, and various closure and fastening features for easy donning and removal.

The member 251 can be secured to the fabric vest 252 by engaging the proximal end 256 of the member within a pocket 258 in the fabric vest located near the base of the spine of the wearer 260. The member can be further secured to the fabric vest by one or more fabric loops forming a keeper structure 259 located to engage a medial portion of the member. Both the pocket and keeper structures can be shaped and dimensioned to frictionally retain the engaged portions of the member. For example, the pocket can have a shape commensurate with the shape of the proximal end of the member. Where the proximal end of the member is substantially cylindrically shaped or having a very gradual conical taper, the pocket can also be cylindrically shaped having an inner diameter matching the maximum outer diameter of the member. The keeper can have a slightly oversized through-hole to allow minor and limited lateral movement of the member therein, and slight relative longitudinal movement as can occur when the wearer transitions between an upright and hunched over posture.

The member 251 can be secured to the head harness 255 by a flexible cord connector 254 having a distal end attached to a landing 262 secured to headgear 263 worn by the wearer 260, and a proximal end attached to the distal end 257 of the member. The flexible cord can be substantially inelastic, or be made from elastic material to form a spring which provides greater stretching resistance as it is stretched.

Figure 28:
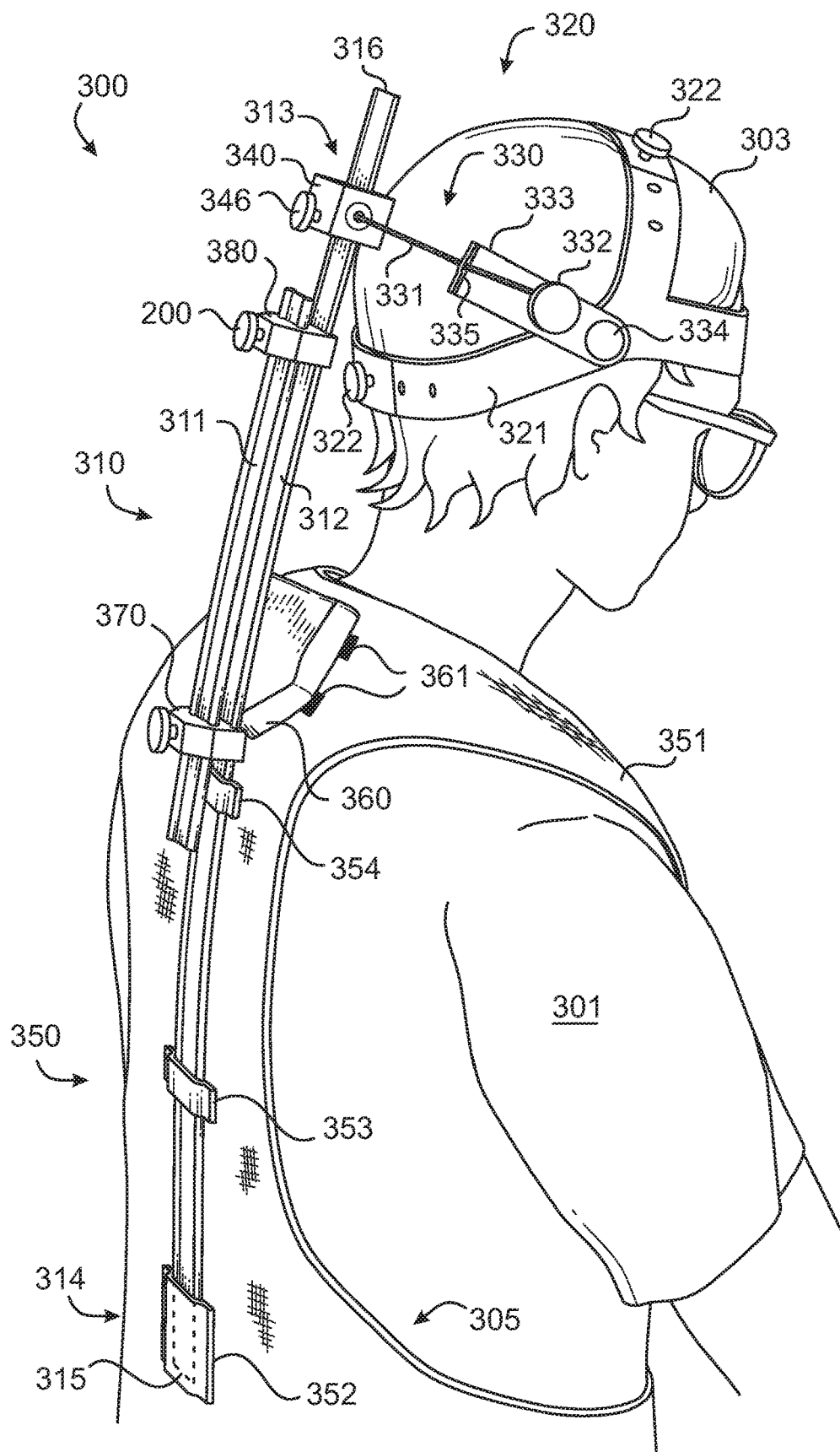
FIG. 28 is a diagrammatic perspective view of a person wearing a body part support device having an adjustable and dual member variable stiffness support beam according to an alternate exemplary embodiment of the invention.

Referring now to FIGS. 28-30, there is shown an alternate embodiment of a body part support device 300 adapted to support the head and neck of a wearer 301 during repetitive activities in which the head is temporarily and repeatedly cantilevered out in front of the wearer in a slight to moderate hunched over posture. In some embodiments including this one, the variable stiffness beam 310 can include a pair of individual members, namely a first, posterior member 311 and a second, anterior member 312 secured to one another by a pair of spaced apart adjustable blocks 370, 380. The anterior member can be the longer of the two members providing attachment locations 313, 314 for the first and second harnesses 320, 350, whereas the posterior member can provide stiffness adjustability as will be described in greater detail below. The posterior and anterior location of the members, as opposed to a side-to-side, laterally spaced apart orientation can provide significant adjustability to the stiffness of the beam in response to the primary load of a cantilevered head which is in line with a plane containing both members. In other words both members can reside within a substantially vertical plane substantially bisecting the wearer into left and right sides.

The device 300 can include a first harness 320 secured to a first body part which can be the head 303 of the wearer, and a second harness 350, spaced apart from the first harness, secured to a second body part which can be the lower back region 305 of the torso. Thus, in some embodiments including this one, the first harness can be referred to as the head harness 320 and the second harness as the torso harness 350. The head harness can be separate and spaced apart from the torso harness. Both harnesses can be secured to a variable stiffness structural beam 310 including the posterior and anterior members 311, 312 separated in a front-to-back manner by a pair of longitudinally spaced apart adjustable blocks 370,380. The head harness 320 can be secured to the beam at a first location 313 near the beam's distal end 316 on the anterior member 312. The torso harness can be secured to the beam at a second location 314 near the beam's proximal end 315 on the anterior member.

The head harness 320 can include a headgear 321 in the form of a helmet-like garment that firmly secures to the wearer's head 303 and thus remains substantially stationary with respect to the head. Adjustments 322 can adjust the headgear to comfortably conform and secure to the wearer's head. These adjustments can releasably secure overlapping straps to one another using various means known to the art such as discrete plastic snap-fittings, corresponding patches of hook-and-vane-type fabric fasteners, and spring-loaded posts engaging discrete holes as shown for example.

A connector 330 can secure the headgear 321 to the first location 313 on the anterior member 312 of the beam 310. The connector can include a flexible cable 331 in which both ends are secured to opposite sides of the headgear. A first end of the cable can secure to a spindle 332 rotatably mounted upon a guide bracket 333 attached to the headgear at a swivel mount 334. The spindle can form a landing for the cable end on the headgear. The guide bracket 333 can include a cable guide 335 through which the cable slidingly passes and bears against. The opposite end of the cable can attach to a similar guide bracket mounted to the opposite side of the headgear (not shown) with or without an adjustable spindle forming another landing for the cable on the headgear. The distance between the headgear and the member can be adjusted by adjusting the amount of the cable wound upon the spindle. In this orientation a single plane can intersect, and vertically and substantially symmetrically bisect the wearer and both members.

As shown primarily in FIG. 30, a middle portion 331a of the cable 331 can slidingly engage the housing 340 mounted to the beam 310. A pair of rounded, funnel-shaped cable guides 341 slidingly support the cable allowing side-to-side movement 342 of the cable with respect to the housing. In this way, those skilled in the art will readily appreciate that the user can have the freedom to comfortably twist their head in a yawing fashion with very little resistance. This arrangement can allow essentially unrestricted rotational movement of the head with respect to the beam while the beam provides its support.

Each cable guide 341 can have rounded edges 343 surrounding a central hole to ease threading the cable therethrough during assembly and to reduce wear on the cable. Similar to the embodiment shown in FIG. 19, the location of the housing with respect to the member 312, and thus the beam, can be adjusted by longitudinally moving the housing along the member. The location of the housing on the member can be locked by a pair of resilient oppositely engaging pressure pads 344, 345 whose spacing is adjusted by turning of a threaded knob 346. In this way the housing can provide part of the connector 330 securing the beam to the headgear 321, and be a component of the head harness 320. In this way the head harness can flexibly and adjustably secure to the beam.

Referring back to FIG. 28, the torso harness 350 can be in the form of a fabric vest or garment 351 worn on the torso of the user. The torso harness can include an attachment structure for securing the second location 314 or proximal end of the anterior member 312, and thus the beam 310, to the base of the spine. The attachment structure can include a base located near the base of the spine of the wearer in the form of a pocket 352 engaged by the proximal end 316 of the anterior member. The anterior member can be further secured to the garment by one or more fabric loops forming keepers 353, 354 located to engage a medial portion of the anterior member.

Similar to the embodiment of FIG. 27, both the pocket 352 and keeper structures 353, 354 can be shaped and dimensioned to frictionally retain the engaged portions of the anterior member 312 of the adjustable variable stiffness beam 310. For example, the pocket can have a shape commensurate with the shape of the proximal end of the member. Where the proximal end of the member is substantially quadrangularly shaped or having a very gradual trapezoidal taper, the pocket can also be quadrangularly shaped having an inner diameter matching the maximum outer diameter of the member. The keeper can have a slightly oversized through-hole to allow minor and limited lateral movement of the member therein, and slight relative longitudinal movement as can occur when the wearer transitions between an upright and hunched over posture.

A cushion 360 made from a durable resilient material such as fabric coated foam rubber can be secured to the garment 351 by one or more corresponding fabric fasteners 361. The cushion can be located on the upper back of the user 301 to bear against the beam 310 and thereby enhance comfort. Cushions having different thicknesses can be easily replaced to adjust the amount of contact with the beam to further enhance comfort. The use of patches of fabric fastener also allow slight adjustment of the location of the cushion on the garment in order to change the point of contact with the beam and thereby potentially alter its stiffness and to provide padding for incidental contact between a medial portion of the beam and the user.

Referring primarily to FIG. 29, there is shown the various components of the adjustable variable stiffness beam 310 according to an exemplary embodiment of the invention. The beam can extend along a longitudinal axis Lal. The beam can include a first solid, but resiliently flexible oblong posterior member 311 and a second solid, but resiliently flexible oblong anterior member 312 separated from each other by a pair of blocks 370, 380, themselves being longitudinally separated by a spacing S1. The members can be substantially parallelly spaced apart from each other by a distance D1 perpendicular to the longitudinal axis, thus latitudinally spacing the members apart. In this way, the members may be kept from directly contacting or substantially diverging from one another. In other words, they can be arranged in such a way that there is an absence of direct contact between the two members. The members can be made from a solid, but resiliently flexible material such as steel, aluminum, plastic, or a fiber-infused composite material such as fiberglass or carbonfiber composite material. Those skilled in the art of mechanics will appreciate that the components or the members shown in the drawing may be oversized or undersized, and their shape exaggerated in order to enhance clarity.

The first solid, but resiliently flexible oblong posterior member 311 can have a substantially quadrangular oblong shape having largest dimension in the longitudinal direction terminating at a near or proximal end 313 and a far or distal end 314. The overall shape of the member can be similar to the member shown in FIGS. 3-8, having a pair of spaced apart tapering rods joined by a medial web. The member can have a substantially uniform width, but a substantially tapering thickness, thus providing a variable stiffness along its longitudinal length, and variable torsional stiffness. Alternately, the posterior member can have a substantially uniform width, substantially uniform thickness, and its variable stiffness supplied by differential fiber orientation zones as described in connection with FIGS. 13-15. Alternately, the posterior member can have substantially uniform stiffness along its longitudinal length forming a substantially uniform stiffness member. Regardless of whether the posterior member has variable or uniform stiffness along its longitudinal length, the stiffness of the beam 310 can be adjusted by adjusting the longitudinal positioning of the blocks separating the two members as will be described below. Or, where the posterior member does exhibit variable longitudinal stiffness, the stiffness of the beam can be adjusted by adjusting the longitudinal position of the posterior member with respect to the blocks as shown by arrows 317a,317b.

Similar to the posterior member 311, the second solid, but resiliently flexible oblong anterior member 312 can have a substantially quadrangular oblong shape having largest dimension in the longitudinal direction terminating at a near or proximal end 315 and a far or distal end 316. The second member can have a substantially uniform width, but a substantially tapering thickness and/or differential fiber orientation zones as described in connection with FIGS. 13-15, thus providing a variable stiffness along its longitudinal length, and variable torsional stiffness. Again, the shape of the anterior member can be similar to the member shown in FIGS. 3-8, having a pair of spaced apart tapering rods joined by a medial web.

Further, it shall be clear that the posterior member 311 can achieve variable stiffness by having a cross-sectional geometry that changes along its longitudinal length. Specifically, the member can taper in thickness from its near end 313 where the thickness T1 is larger, to its distal end 314 where the thickness T2 is smaller. In this way the more distal part of the member can be made more flexible than the proximal part, and the member has a variable cross-sectional geometry along the longitudinal length of the member. The same is true for the anterior member 312.

The members 311, 312 can be held in their front-to-back spaced apart orientation by a pair of blocks 370, 380 separated by a longitudinal spacing S1. The spacing can be adjusted by changing the longitudinal location of one or both blocks.

Each block, 380 for example, can be locked in its longitudinal position by engaging a first friction pad 381 against the posterior member 311, and engaging a second friction pad 382 against the anterior member 312. The friction provided by each pad can be adjusted by turning its respective threaded fastener 385, 386. In some embodiments including this one, the threaded fastener 386 for the friction pad 382 engaging the anterior member can be recessed and actuated using a tool such as an allen wrench. In this way the position of each block with respect to the anterior member is more permanent, and non-adjustable while the device is being worn, whereas the threaded fastener 385 for the friction pad 381 engaging the posterior member can be actuated by the exposed knob 387 so that the position of the block with respect to the posterior member is adjustable while the device is being worn. The other block 370 can be similarly constructed.

In this way the longitudinal position of the posterior member 311 can be adjusted as indicated by arrows 317a, 317b by loosening the respective friction pads on both blocks and sliding the posterior member longitudinally, in order to adjust the variable stiffness of the overall beam 310. Thus, both blocks 370, 380 can be fixedly secured to one of the members 312 and releasably secured to the other member 311 while the device is being worn. In this way the device provides a means for attaching to and supporting the head and spine of a user in an adjustable variable stiffness manner while being worn.

Referring now to FIG. 31, there is shown an alternate embodiment of a block 390 used to help maintain the location of the posterior member 391 and the anterior member 392 with respect to one another. In some embodiments including this one, the block can be adjusted to change the separation distance D4, perpendicular to the longitudinal axis, between the members. The separation distance can be adjusted by a distance adjustment mechanism such as a rotating a turnbuckle-type wheel 395 that has a pair of alternately threaded coaxial posts that engage threaded bores in a pair of platforms 393,394, that bear against the inwardly facing surfaces of the members. Friction pads actuated by threaded knobs 398, 399 can be used to releasably secure the block to the members and allow for longitudinal movement of the members with respect to the block. In this way, a single separation distance adjustable block can be used to adjust the angle A1 of one member with respect to the other so that their mutual orientation can be parallel or non-parallel. Adjusting the angle between the members can also further adjust the stiffness of the beam. Two such separation distance adjustable blocks can be used to separate the members while maintaining their angular orientation with respect to one another. In other words, the first member can be elongated along a first longitudinal direction and the second member can be elongated along a second longitudinal direction, and the adjustable block can allow those longitudinal directions to be parallel or non-parallel.

Figure 32:
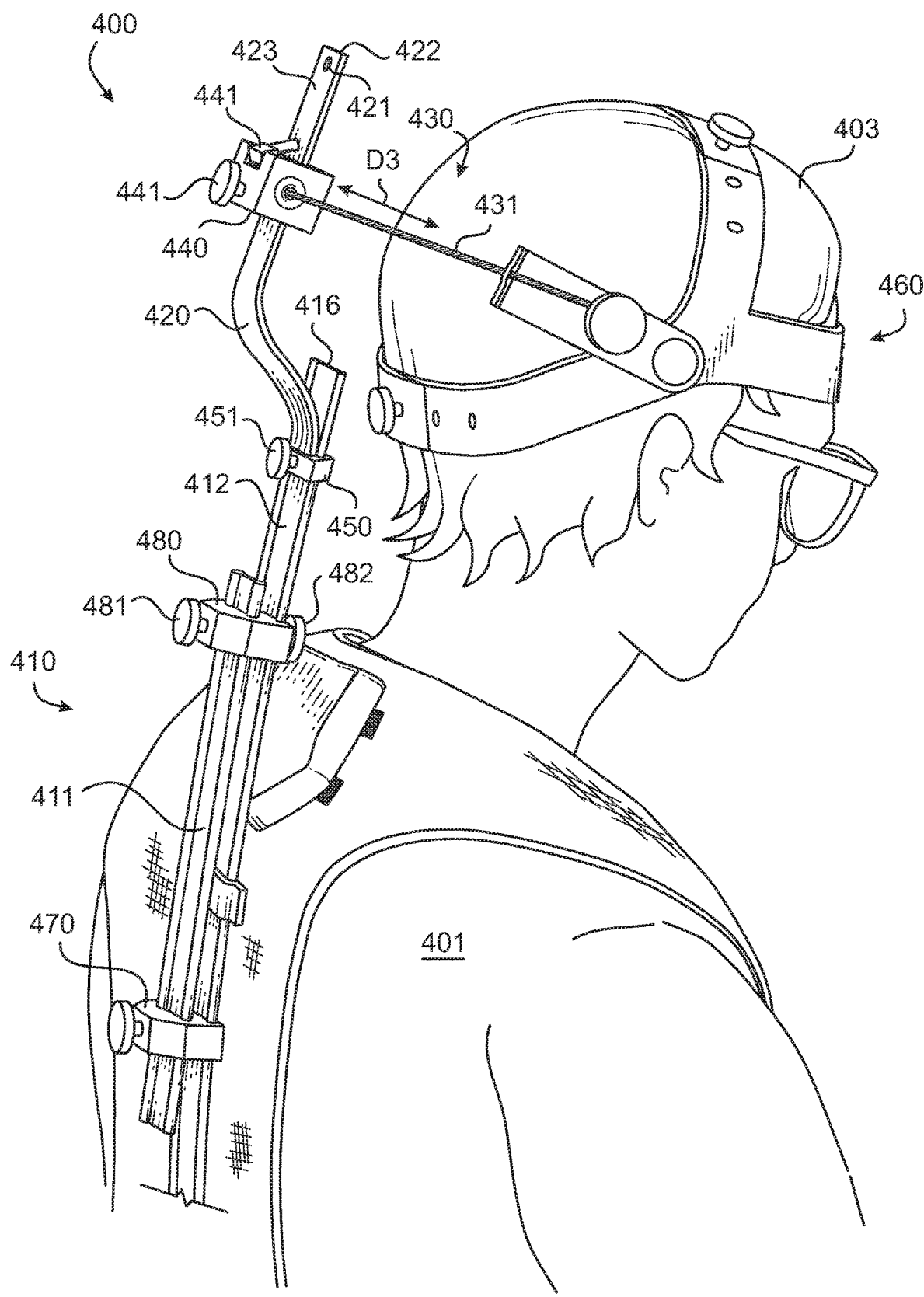
FIG. 32 is a diagrammatic perspective view of a person wearing a body part support device having a reduced profile adjustable and variable stiffness support beam according to an alternate exemplary embodiment of the invention.
Figure 33:
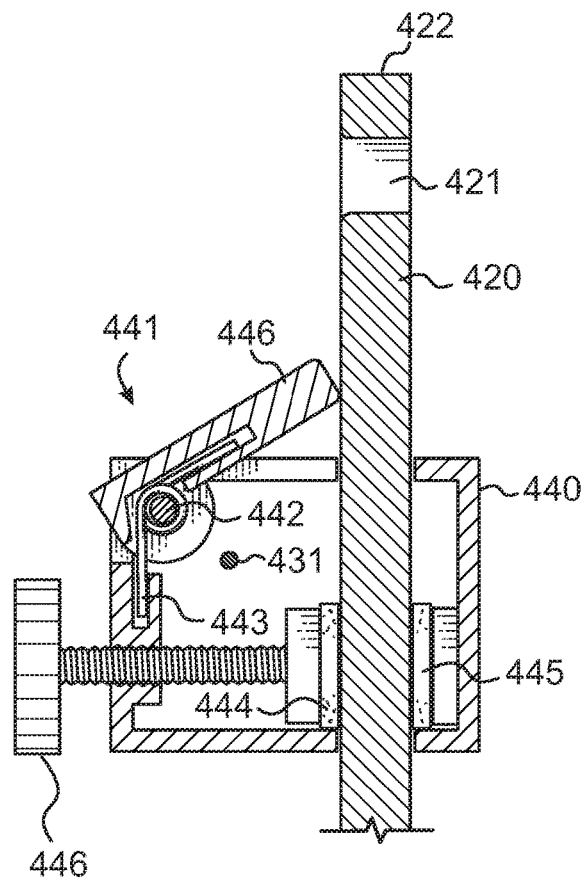
FIG. 33 is a diagrammatic partial, cross-sectional side view of the adjustable connector component having a longitudinal stopping pin of the body part support device of FIG. 32.

Referring now to FIGS. 32-33, there is shown an alternate embodiment of a body part support device 400 similar to the one described above in connection with the embodiment of FIG. 28 but with some important differences. In some embodiments including this one, the beam 410 can have a curved extension bracket member 420 secured to the anterior member 412 distal to the pair of separator blocks 470,480 and near the distal end 416. which can increase the distance D3 between the housing 440 and the head 403 of the wearer 401. This allows for freer movement of the head in an extension, or head-up, motion while keeping a compact profile to the support device thereby reducing the chances of the device snagging on other equipment in a surgical setting for example.

The extension bracket member 420 can be adjustably secured to the anterior member 412 using an adjustable grasper 450 fixedly attached to the extension bracket member and having a friction pad similar in function to block 380 shown in connection with the embodiment of FIG. 28. The grasper can be tightened or loosened by turning a knob 451. Loosening the friction pad allows for longitudinal movement of the extension bracket member with respect to the anterior member.

The housing 440 of the headgear connector 430 can be similar to the housing shown in the embodiment shown in FIG. 28, where the location of the housing with respect to the extension bracket member 420, and thus the beam 410, can be adjusted by longitudinally moving the housing along the bracket member. The location of the housing on the member can be locked by a pair of resilient oppositely engaging pressure pads 444, 445 whose spacing is adjusted by turning of a threaded knob 446. The housing can similarly slidingly support the laterally engaged cable 431 adjustably connected to the headgear 460.

Different from the embodiment of FIG. 28, in some embodiments including this one, the housing 440 can include a stopping mechanism 441 which prevents inadvertent longitudinal movement of the housing beyond the distal end 422 of the extension bracket member 420 and thus the distal end of the beam 410. The stopping mechanism can include a spring-loaded stopping pin 446 rotatably mounted to the housing upon an axle 442. A spring 443 biases the pin against the smooth outer surface 423 of the extension bracket member 420. The pin is shaped and dimensioned to engage a hole 421 formed near the distal end 422 of the extension bracket member when the housing is moved longitudinally distally beyond a certain point. In this way the pin engaging the hole prevents the housing from being inadvertently moved distally off the distal end of the bracket.

Figures 34, 35:
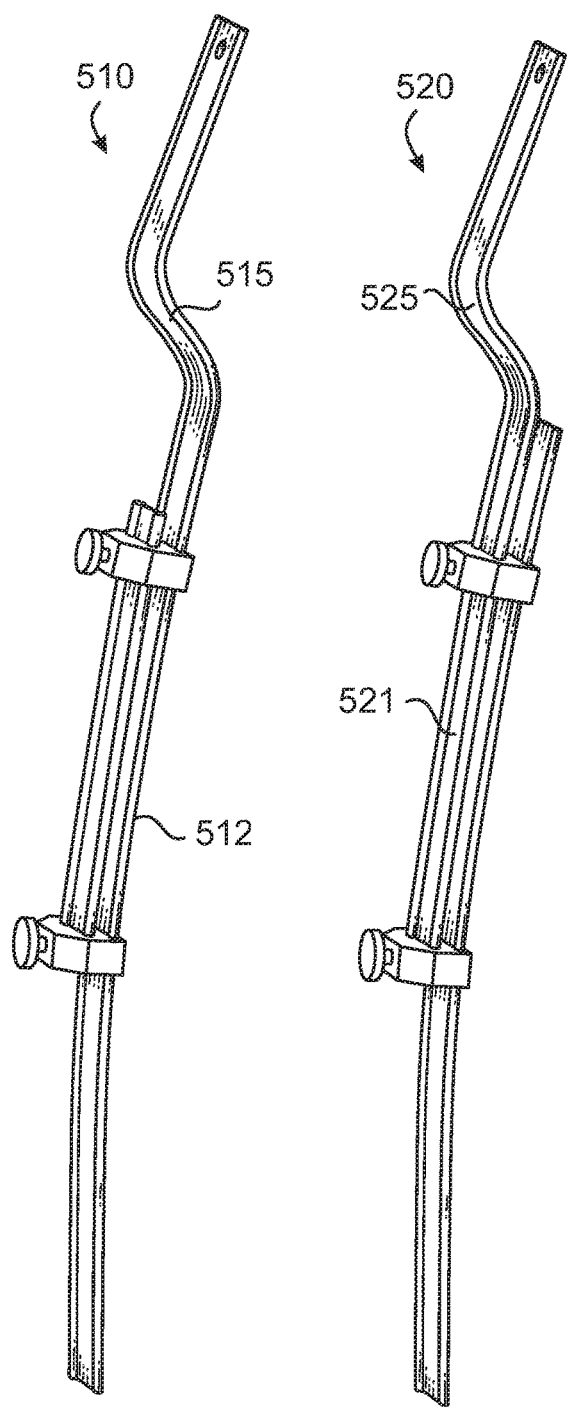
FIG. 34 is a diagrammatic perspective view of a reduced profile, dual member, adjustable variable stiffness support beam according to an alternate exemplary embodiment of the invention.
FIG. 35 is a diagrammatic perspective view of a reduced profile, dual member, adjustable variable stiffness support beam according to an alternate exemplary embodiment of the invention.

FIG. 34 shows that an adjustable and variable stiffness support beam 510 can have a curved extension bracket member 515 formed integrally with the anterior member 512 thus avoiding the need for any grasper mechanism.

FIG. 35 shows that an adjustable and variable stiffness support beam 520 can have a curved extension bracket member 525 formed integrally with the posterior member 521.

Figure 36:
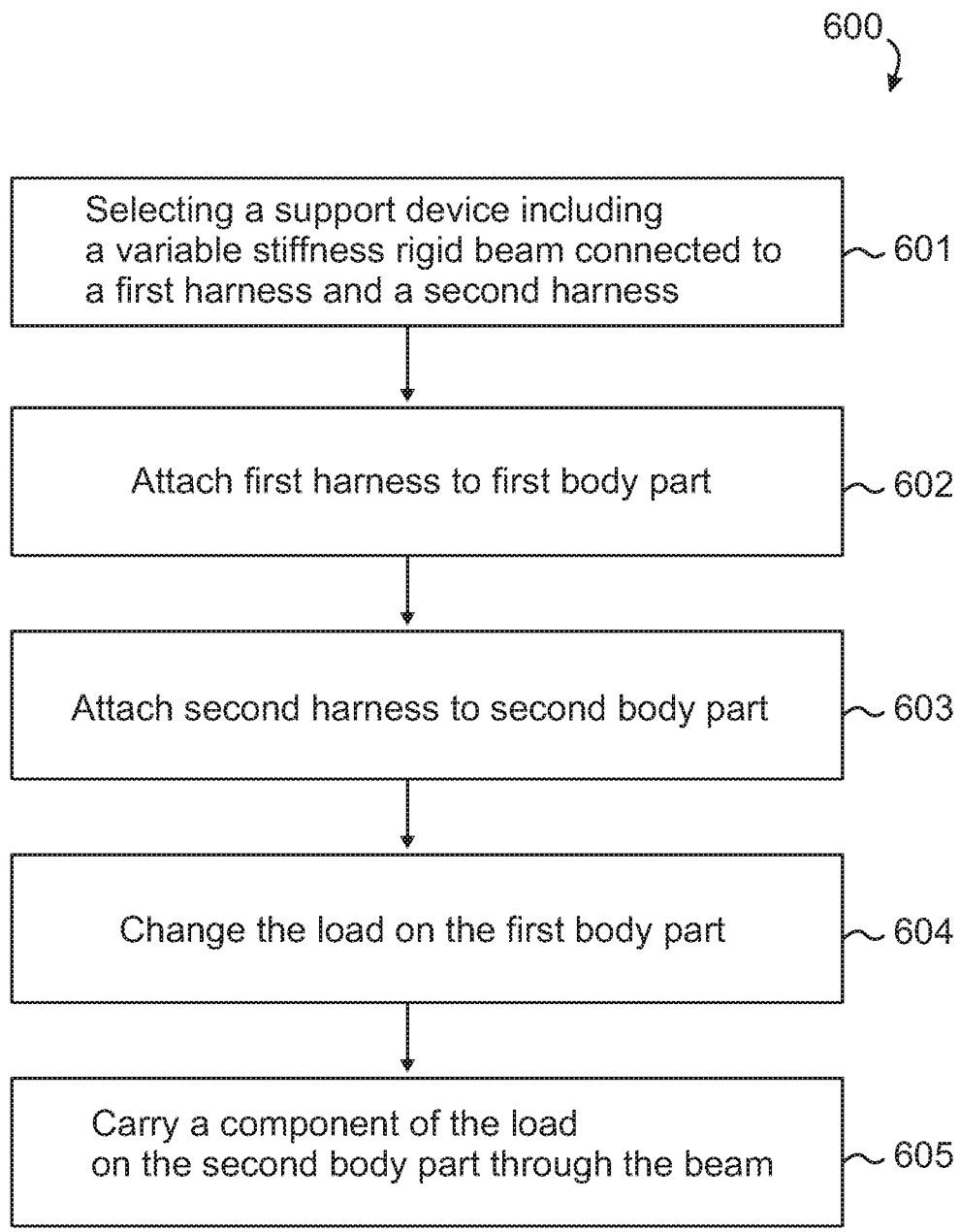
FIG. 36 is a flow chart diagram of a method for using a body part support device according to an exemplary embodiment of the invention.

Referring now to FIG. 36 now will be described an exemplary embodiment of a method 600 for supporting the body part of a wearer such as a person. The method can include selecting a support device 601 including a substantially rigid, variable stiffness beam connected or otherwise secured to a first harness at a first location on the beam, and connected or otherwise secured to a second harness at a second location on the beam, where the first and second locations are spaced apart. The first harness of the support device can be attached 602 to a first body part of the person such as the person's head. The second harness of the support device can be attached 603 to a second body part of the person such as the person's torso. In this way the two body parts can be spaced apart from one another.

Once the support device is attached to the body parts of the wearer, a load can be changed 604 on the first body part. For example, for a standing person wearing the device, when the head is tilted forward, the load that is the weight of the head is changed so that the moment on the person's neck is increased. This change in load allows a component of the load to be carried 605 by the second body part through the beam. In other words, the weight of the head is now partially supported by the torso through the forces carried by the device.

Figures 37, 38:
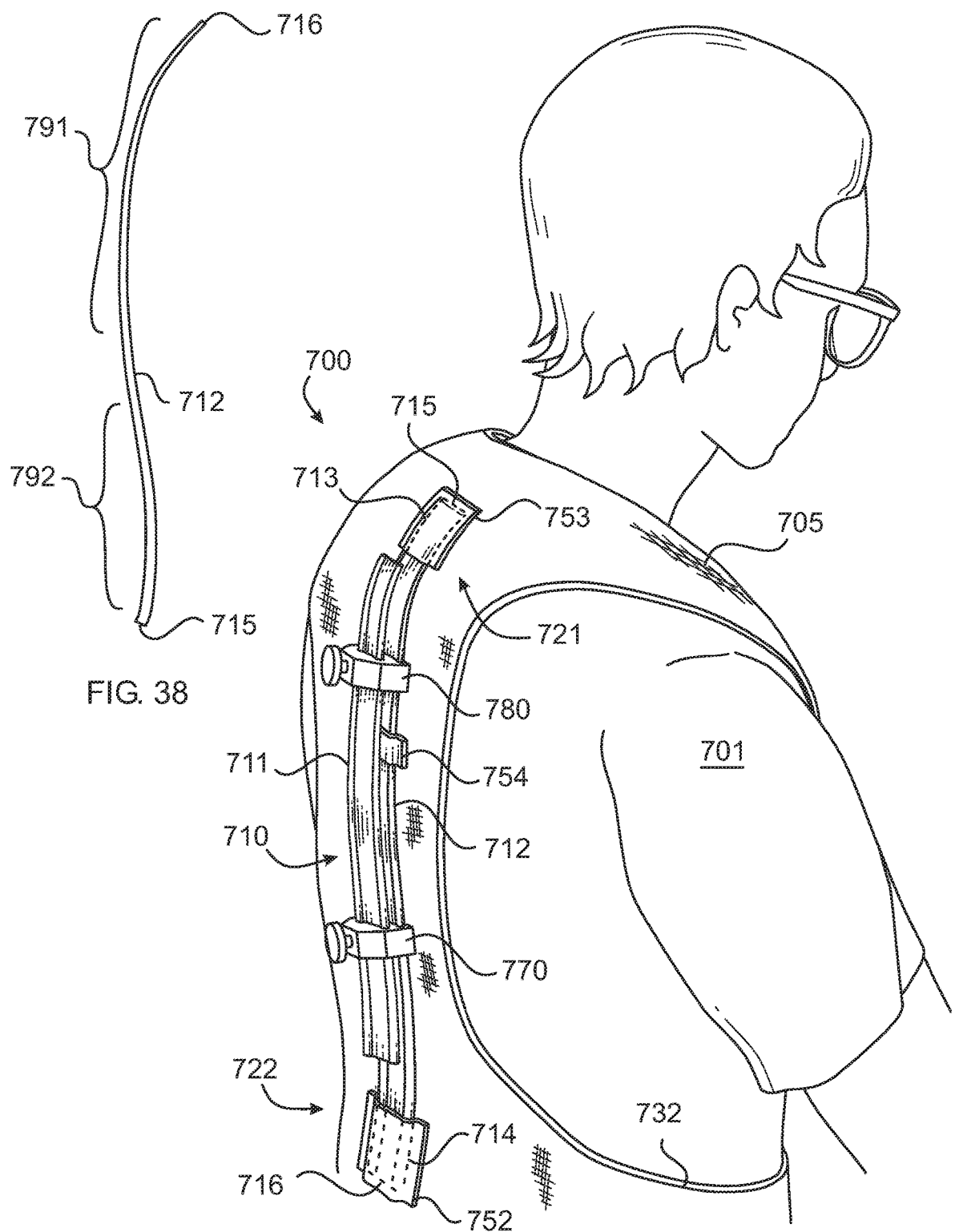
FIG. 37 is a diagrammatic perspective view of a person wearing a back support device having a lordodicly shaped variable stiffness support beam according to an alternate exemplary embodiment of the invention.
FIG. 38 is a diagrammatic side view of the lordodicly shaped anterior member of the support beam of FIG. 37.

Referring now to FIGS. 37-38, there is shown an alternate embodiment of a body part support device 700 adapted to support the thoracic vertebrae of a wearer 701 during repetitive activities in which the wearer is temporarily and repeatedly in a slight to moderate hunched over posture. In some embodiments including this one, the variable stiffness beam 710 can include a pair of individual members, namely a first, curved posterior member 711 and a curved anterior member 712 separated from one another in a front-to-back manner by a pair of adjustable blocks 770,780.

The body part support device 700 can be similar to the one described above in connection with the embodiment of FIG. 28 but with some important differences. In some embodiments including this one, the curvature of the members can be selected to more closely match the typical lordotic curvature of the spine. Thus, the anterior member 712 can have a substantially S-shaped appearance where there is distal convexity 791 and proximal concavity 792 as viewed from the back. Further, the anterior member can have a variable stiffness that is proximally more stiff and distally less stiff to more closely match the typical stiffness of the spine. In this way the anterior member can support the anatomy rather than constrain it. As with prior embodiments the variable stiffness can be accomplished by the geometry of the member such as through tapering its thickness, and/or through varying the orientation of the fiber layers as described in connection with FIGS. 13-15.

The posterior member 711 can have a variable stiffness similar to the anterior member 712 or a uniform stiffness. Adjustability of the stiffness of the beam 710 can be accomplished by longitudinal movement of one or both of the adjustable separator blocks 770,780 and/or the longitudinal sliding of the posterior member with respect to the anterior member. It shall be noted that the flexibility of the posterior member will allow this slight relative longitudinal movement even though the at-rest shape of the member will be S-shaped. Placing the posterior member under bending stress by sliding it longitudinally with respect to the anterior member can adjust the variable stiffness of the beam.

The body part support device 700 provides a first harness 721 secured to a first body part which in this embodiment is the upper thoracic region of the spine, and a second harness 722, spaced apart from the first harness, secured to a second body part which in this embodiment is the lower lumbar region of the spine. Thus, in this embodiment the first harness can be referred to as the thoracic harness 721 and the second harness as the lumbar harness 722. The thoracic harness can be separate and spaced apart from the lumbar harness. The thoracic harness can be formed by a member end retaining thoracic pocket 753 formed into a thoracic region on a torso worn vestment 705. The lumbar harness can be formed by a member end retaining lumbar pocket 752 formed into a lumbar region of the same vestment. The anterior member can be further secured to the vestment by one or more fabric loops forming keepers 754 located to engage a medial portion of the anterior member.

The variable stiffness beam 710 can be secured at a first location 713, near the distal end 715 of the anterior member 712, to the thoracic harness 721, and can be secured at a second location 714, near the proximal end 716, to the lumbar harness 722. The thoracic pocket thus can form a connector connecting the first location on the beam and to the thoracic harness, and the lumbar pocket can form an attachment structure securing the second location on the beam to the lumbar harness. In this way, part of the load on the thoracic vertebrae can be transferred to the lumbar vertebrae by the beam and to the hips by way of a waistbelt portion 732 of the vestment 705. Indeed, the amount of support against the load can increase as the curvature of the throacic regoin increases and the curvature of the lumber region lessens.

The above-described embodiments of the variable stiffness beam can provide bending stiffness as a function of distance from the proximal end of the beam. The stiffness can be determined according to the geometry of the member or members used, their material characteristic such as fiber orientation for embodiments using fiber composite materials within the various zones of the member, and the settings of the above-described adjustable features such as the tensioning cable, positioning of the adjustable blocks, and longitudinal positioning of the posterior member.

It has been found that the properties exhibited by the above described structural beam embodiments can be useful in body part support devices due to the rigorous dynamical moments subjected to such structures and the variable stiffness of the beam along its length.

In the context of head, neck and/or back support for surgeons, the above-described embodiments provide enough flexibility to allow for free motion of these body parts through flexion, extension, lateral movement, and rotation while lessening the load on the neck and back due to gravity acting on the head. When used over time, the typical constant overloading of the paraspinous muscles can be relieved and lead to less pain and discomfort during work and lessen the wear and tear of the upper thoracic and cervical spinous joints.

In this way the device can provide an external spine support system for reducing loads imposed on the back, neck, spine and head during work and tasks related posture and body positioning. In this way, in some embodiments the variable stiffness beam attached to the headgear can provide a counterbalance force to help support the head, neck and upper back. In some embodiments the variable stiffness beam can include one or more members shaped as a cylindrical member, a tapered flat plate or bar, or any combination of geometries. In some embodiments, each member can be a flat plate with integral tapered longitudinal edges of greater thickness than the plate. Such geometry can position tapered rods over and along the length of the paraspinal muscles, ideal for providing midline, lateral and torsional support for the spine. In some embodiments the connector attaching the variable stiffness beam to headgear can have a quick coupling mechanism to allow easy engagement and disengagement from the support beam.

In some embodiments the bending stiffness of the variable stiffness beam can vary along its length and can be infinitely tunable for individual users. In some embodiments the beam can include one or more members having a tapered geometry where the edges can be bridged together by the flat plate which can provide for torsional support of the head and neck in a side-to-side twisting movement while maintaining a counterbalance support in bending and lateral movement. In some embodiments the variable stiffness beam can include one or more members made of a composite construction designed to function as a lightweight counterbalance spring. In some embodiments the spring rate, or deflection force, can vary along the length of the beam to mimic the size and strength of the spinal column. In some embodiments a tensioning cable may be included which can be tensioned to increase the performance and stiffness of the beam. The cable may be tensioned by means of a screw, a spring, or a motor.

While the preferred embodiments of the invention have been described, modifications can be made and other embodiments may be devised without departing from the spirit of the invention and the scope of the appended claims.

What is claimed is:

1. A device for flexibly supporting a body part, said device comprises:
    an oblong beam having a variable stiffness along a longitudinal length, wherein the variable stiffness is adjustable, wherein said oblong beam comprises a cable extending along the longitudinal length of said oblong beam; whereby said cable being under tension increases a stiffness of said oblong beam;
    a first harness secured to a first location on said oblong beam;
    a second harness secured to a second location on said oblong beam;
    wherein said first location is longitudinally spaced apart from said second location;
    wherein said first harness is adapted to secure to a first body part;
    wherein said second harness is adapted to secure to a second body part;
    whereby said oblong beam is oriented to carry a load component generated by said first body part when said first harness is secured to said first body part and said second harness is secured to said second body part.

2. The device of claim 1, wherein said first harness comprises a connector connecting said first harness to said first location on said oblong beam.

3. The device of claim 1, which further comprises an attachment structure securing said second harness to said second location on said oblong beam.

4. The device of claim 1, wherein said device further comprises:
    a first member having a first oblong shape in a longitudinal direction;
    said first member having a near end and a far end;
    a second member having an second oblong shape in said longitudinal direction;
    said second member having a proximal end and a distal end;
    wherein said first and second members are spaced apart from each other by a separation distance;
    a first block connecting said first member to said second member;
    a second block connecting said first member to said second member;
    wherein said first and second blocks are longitudinally spaced apart by a spacing.

5. The device of claim 4, wherein said second member has a stiffness that is longitudinally variable.

6. The device of claim 1, wherein said first harness comprises:
    a headgear adapted to affix to the head of a wearer; and,
    a connector connecting said headgear to said first location on said oblong beam.

7. The device of claim 6, wherein said first harness further comprises:
    a housing slidingly mounted to said oblong beam;
    a cable extending between said housing and said headgear;
    a guide bracket hingedly connected to said headgear; and,
    said guide bracket bearing against a portion of said cable.

8. The device of claim 7, wherein said first harness further comprises:
    a spool mounted to said guide bracket adjusting a length of said cable.

9. The device of claim 7, wherein said first harness further comprises:
    a stopping mechanism preventing longitudinal movement of said housing with respect to said oblong beam; said stopping mechanism comprising:
    a spring-loaded pin mounted to said housing;
        said pin being shaped and dimensioned to engage a hole in said oblong beam located near an end of said oblong beam.

10. The device of claim 1, wherein said oblong beam is secured to said first harness through a connector extending a connector distance between said first harness and said oblong beam, and wherein said connector distance is adjustable.

11. The device of claim 10, wherein said connector comprises a releasable lock for fixing said connector distance.

12. The device of claim 10, wherein said connector comprises a flexible tether having an adjustable length.

13. The device of claim 12, wherein said flexible tether is elastic thereby forming a spring.

14. The device of claim 12, wherein said connector comprises a spool upon which is wound a portion of said flexible tether.

15. The device of claim 14, which further comprises:
a motor driving said spool; and
a microprocessor controlling said motor in response to commands wirelessly received from a computerized mobile device.

16. The device of claim 1, wherein said oblong beam is secured to said second harness by an attachment structure shaped and dimensioned to firmly position a proximal end of said oblong beam.

17. The device of claim 16, wherein said attachment structure comprises a pocket and at least one keeper structure engaged by a medial portion of said oblong beam.

18. The device of claim 1, wherein said oblong beam further comprises:
a proximal end and a distal end;
said oblong beam having a first cross-sectional area near said proximal end and a second cross-sectional area near said distal end;
wherein said first cross-sectional area is larger than said second cross-sectional area.

19. The device of claim 1, wherein said oblong beam comprises:
a pair of substantially parallel, oblong, spaced-apart rods, laterally joined by a webbing strip;
wherein each of said rods has a variable cross-sectional geometry along a length of said oblong beam.

20. A method for supporting a first body part of a person, said method comprises:
selecting a support device comprising:
a beam having a variable stiffness;
a first harness secured to a first location on said oblong beam;
a second harness secured to a second location on said oblong beam spaced apart from said first location;
attaching said first harness to a first body part of a person;
attaching said second harness to a second body part of said person, wherein said second body part is spaced apart from said first body part;
adjusting a stiffness of said oblong beam;
adjusting a distance between said first location and said first body part;
allowing unrestricted rotational movement of said first body part;
changing a load upon said first body part; and,
carrying a component of said load on said second body part through said oblong beam.

21. A device for flexibly supporting a body part, said device comprises:
an oblong beam having a variable stiffness along a longitudinal length;
a first harness secured to a first location on said oblong beam;
said first harness comprising:
a headgear adapted to affix to the head of a wearer;
a connector connecting said headgear to said first location on said oblong beam;
a housing slidingly mounted to said oblong beam;
a cable extending between said housing and said headgear;
a guide bracket hingedly connected to said headgear; and,
said guide bracket bearing against a portion of said cable;
a second harness secured to a second location on said oblong beam;
wherein said first location is longitudinally spaced apart from said second location;
wherein said first harness is adapted to secure to a first body part;
wherein said second harness is adapted to secure to a second body part;
whereby said oblong beam is oriented to carry a load component generated by said first body part when said first harness is secured to said first body part and said second harness is secured to said second body part.

22. The device of claim 21, which further comprises an attachment structure securing said second harness to said second location on said oblong beam.

23. The device of claim 21, wherein said device further comprises:
a first member having a first oblong shape in a longitudinal direction;
said first member having a near end and a far end;
a second member having an second oblong shape in said longitudinal direction;
said second member having a proximal end and a distal end;
wherein said first and second members are spaced apart from each other by a separation distance;
a first block connecting said first member to said second member;
a second block connecting said first member to said second member;
wherein said first and second blocks are longitudinally spaced apart by a spacing.

24. The device of claim 23, wherein said second member has a stiffness that is longitudinally variable.

25. The device of claim 21, wherein said first harness further comprises:
a spool mounted to said guide bracket adjusting a length of said cable.

26. The device of claim 21, wherein said first harness further comprises:
a stopping mechanism preventing longitudinal movement of said housing with respect to said oblong beam; said stopping mechanism comprising:
a spring-loaded pin mounted to said housing;
said pin being shaped and dimensioned to engage a hole in said oblong beam located near an end of said oblong beam.

27. The device of claim 21, wherein said oblong beam is secured to said first harness through a connector extending a connector distance between said first harness and said oblong beam, and wherein said connector distance is adjustable.

28. The device of claim 27, wherein said connector comprises a releasable lock for fixing said connector distance.

29. The device of claim 27, wherein said connector comprises a flexible tether having an adjustable length.

30. The device of claim 29, wherein said flexible tether is elastic thereby forming a spring.

31. The device of claim 29, wherein said connector comprises a spool upon which is wound a portion of said flexible tether.

32. The device of claim 31, which further comprises:
a motor driving said spool; and
a microprocessor controlling said motor in response to commands wirelessly received from a computerized mobile device.

33. The device of claim 21, wherein said oblong beam is secured to said second harness by an attachment structure shaped and dimensioned to firmly position a proximal end of said oblong beam.

34. The device of claim 33, wherein said attachment structure comprises a pocket and at least one keeper structure engaged by a medial portion of said oblong beam.

35. The device of claim 21, wherein said variable stiffness structural beam further comprises:
   a proximal end and a distal end;
   said oblong beam having a first cross-sectional area near said proximal end and a second cross-sectional area near said distal end;
   wherein said first cross-sectional area is larger than said second cross-sectional area.

36. The device of claim 21, wherein said variable stiffness structural beam comprises:
   a pair of substantially parallel, oblong, spaced-apart rods, laterally joined by a webbing strip;
   wherein each of said rods has a variable cross-sectional geometry along a length of said oblong beam.

37. The device of claim 21, which further comprises:
   a tensioning cable extending along a longitudinal length of said oblong beam and contacting said oblong beam so that an increase in tension in said cable increases a longitudinal stiffness of said oblong beam.

38. A device for flexibly supporting a body part, said device comprises:
   an oblong beam having a variable stiffness along a longitudinal length;
   a first harness secured to a first location on said oblong beam;
   a second harness secured to a second location on said oblong beam;
   wherein said first location is longitudinally spaced apart from said second location;
   wherein said first harness is adapted to secure to a first body part;
   wherein said second harness is adapted to secure to a second body part;
   wherein said oblong beam is secured to said first harness through a connector extending a connector distance between said first harness and said oblong beam, and wherein said connector distance is adjustable;
   wherein said connector comprises a flexible tether having an adjustable length;
   whereby said oblong beam is oriented to carry a load component generated by said first body part when said first harness is secured to said first body part and said second harness is secured to said second body part.

39. The device of claim 38, which further comprises an attachment structure securing said second harness to said second location on said oblong beam.

40. The device of claim 38, wherein said device further comprises:
   a first member having a first oblong shape in a longitudinal direction;
   said first member having a near end and a far end;
   a second member having an second oblong shape in said longitudinal direction;
   said second member having a proximal end and a distal end;
   wherein said first and second members are spaced apart from each other by a separation distance;
   a first block connecting said first member to said second member;
   a second block connecting said first member to said second member;
   wherein said first and second blocks are longitudinally spaced apart by a spacing.

41. The device of claim 40, wherein said second member has a stiffness that is longitudinally variable.

42. The device of claim 38, wherein said first harness further comprises:
   a spool mounted to said guide bracket adjusting a length of said cable.

43. The device of claim 38, wherein said first harness further comprises:
   a stopping mechanism preventing longitudinal movement of said housing with respect to said oblong beam; said stopping mechanism comprising:
   a spring-loaded pin mounted to said housing;
      said pin being shaped and dimensioned to engage a hole in said oblong beam located near an end of said oblong beam.

44. The device of claim 38, wherein said flexible tether is elastic thereby forming a spring.

45. The device of claim 38, wherein said variable stiffness structural beam further comprises:
   a proximal end and a distal end;
   said oblong beam having a first cross-sectional area near said proximal end and a second cross-sectional area near said distal end;
   wherein said first cross-sectional area is larger than said second cross-sectional area.

46. The device of claim 45, wherein said connector comprises a spool upon which is wound a portion of said flexible tether.

47. The device of claim 46, which further comprises:
   a motor driving said spool; and
   a microprocessor controlling said motor in response to commands wirelessly received from a computerized mobile device.

48. The device of claim 38, wherein said oblong beam is secured to said second harness by an attachment structure shaped and dimensioned to firmly position a proximal end of said oblong beam.

49. The device of claim 48, wherein said attachment structure comprises a pocket and at least one keeper structure engaged by a medial portion of said oblong beam.

50. The device of claim 38, wherein said variable stiffness structural beam comprises:
   a pair of substantially parallel, oblong, spaced-apart rods, laterally joined by a webbing strip;
   wherein each of said rods has a variable cross-sectional geometry along a length of said oblong beam.

51. The device of claim 38, which further comprises:
   a tensioning cable extending along a longitudinal length of said oblong beam and contacting said oblong beam so that an increase in tension in said cable increases a longitudinal stiffness of said oblong beam.

52. A device for flexibly supporting a body part, said device comprises:
   an oblong beam having a variable stiffness along a longitudinal length, wherein said oblong beam comprises:
      a pair of substantially parallel, oblong, spaced-apart rods, laterally joined by a webbing strip; and,
      wherein each of said rods has a variable cross-sectional geometry along a length of said oblong beam;
   a first harness secured to a first location on said oblong beam;
   a second harness secured to a second location on said oblong beam;

wherein said first location is longitudinally spaced apart from said second location;

wherein said first harness is adapted to secure to a first body part;

wherein said second harness is adapted to secure to a second body part;

whereby said oblong beam is oriented to carry a load component generated by said first body part when said first harness is secured to said first body part and said second harness is secured to said second body part.

53. The device of claim 52, wherein said first harness comprises a connector connecting said first harness to said first location on said oblong beam.

54. The device of claim 52, which further comprises an attachment structure securing said second harness to said second location on said oblong beam.

55. The device of claim 52, wherein said device further comprises:
a first member having a first oblong shape in a longitudinal direction;
said first member having a near end and a far end;
a second member having an second oblong shape in said longitudinal direction;
said second member having a proximal end and a distal end;
wherein said first and second members are spaced apart from each other by a separation distance;
a first block connecting said first member to said second member;
a second block connecting said first member to said second member;
wherein said first and second blocks are longitudinally spaced apart by a spacing.

56. The device of claim 55, wherein said second member has a stiffness that is longitudinally variable.

57. The device of claim 52, wherein said first harness comprises:
a headgear adapted to affix to the head of a wearer; and,
a connector connecting said headgear to said first location on said oblong beam.

58. The device of claim 57, wherein said first harness further comprises:
a housing slidingly mounted to said oblong beam;
a cable extending between said housing and said headgear;
a guide bracket hingedly connected to said headgear; and,
said guide bracket bearing against a portion of said cable.

59. The device of claim 58, wherein said first harness further comprises:
a spool mounted to said guide bracket adjusting a length of said cable.

60. The device of claim 58, wherein said first harness further comprises:
a stopping mechanism preventing longitudinal movement of said housing with respect to said oblong beam; said stopping mechanism comprising:
a spring-loaded pin mounted to said housing;
said pin being shaped and dimensioned to engage a hole in said oblong beam located near an end of said oblong beam.

61. The device of claim 52, wherein said oblong beam is secured to said first harness through a connector extending a connector distance between said first harness and said oblong beam, and wherein said connector distance is adjustable.

62. The device of claim 61, wherein said connector comprises a releasable lock for fixing said connector distance.

63. The device of claim 61, wherein said connector comprises a flexible tether having an adjustable length.

64. The device of claim 63, wherein said flexible tether is elastic thereby forming a spring.

65. The device of claim 63, wherein said connector comprises a spool upon which is wound a portion of said flexible tether.

66. The device of claim 65, which further comprises:
a motor driving said spool; and
a microprocessor controlling said motor in response to commands wirelessly received from a computerized mobile device.

67. The device of claim 52, wherein said oblong beam is secured to said second harness by an attachment structure shaped and dimensioned to firmly position a proximal end of said oblong beam.

68. The device of claim 67, wherein said attachment structure comprises a pocket and at least one keeper structure engaged by a medial portion of said oblong beam.

69. The device of claim 52, which further comprises:
a tensioning cable extending along a longitudinal length of said oblong beam and contacting said oblong beam so that an increase in tension in said cable increases a longitudinal stiffness of said oblong beam.

70. The device of claim 52, wherein said oblong beam further comprises:
a proximal end and a distal end;
said oblong beam having a first cross-sectional area near said proximal end and a second cross-sectional area near said distal end;
wherein said first cross-sectional area is larger than said second cross-sectional area.

71. A device for flexibly supporting a body part, said device comprises:
an oblong beam having a variable stiffness along a longitudinal length;
a tensioning cable extending along a longitudinal length of said oblong beam and contacting said oblong beam so that an increase in tension in said cable increases a longitudinal stiffness of said oblong beam;
a first harness secured to a first location on said oblong beam;
a second harness secured to a second location on said oblong beam;
wherein said first location is longitudinally spaced apart from said second location;
wherein said first harness is adapted to secure to a first body part; and,
wherein said second harness is adapted to secure to a second body part;
whereby said oblong beam is oriented to carry a load component generated by said first body part when said first harness is secured to said first body part and said second harness is secured to said second body part.

72. The device of claim 71, wherein said first harness comprises a connector connecting said first harness to said first location on said oblong beam.

73. The device of claim 71, which further comprises an attachment structure securing said second harness to said second location on said oblong beam.

74. The device of claim 71, wherein said device further comprises:
a first member having a first oblong shape in a longitudinal direction;

said first member having a near end and a far end;

a second member having an second oblong shape in said longitudinal direction;

said second member having a proximal end and a distal end;

wherein said first and second members are spaced apart from each other by a separation distance;

a first block connecting said first member to said second member;

a second block connecting said first member to said second member;

wherein said first and second blocks are longitudinally spaced apart by a spacing.

75. The device of claim 74, wherein said second member has a stiffness that is longitudinally variable.

76. The device of claim 71, wherein said first harness comprises:

a headgear adapted to affix to the head of a wearer; and, a connector connecting said headgear to said first location on said oblong beam.

77. The device of claim 76, wherein said first harness further comprises:

a housing slidingly mounted to said oblong beam;

a cable extending between said housing and said headgear;

a guide bracket hingedly connected to said headgear; and, said guide bracket bearing against a portion of said cable.

78. The device of claim 77, wherein said first harness further comprises:

a spool mounted to said guide bracket adjusting a length of said cable.

79. The device of claim 77, wherein said first harness further comprises:

a stopping mechanism preventing longitudinal movement of said housing with respect to said oblong beam; said stopping mechanism comprising:

a spring-loaded pin mounted to said housing;

said pin being shaped and dimensioned to engage a hole in said oblong beam located near an end of said oblong beam.

80. The device of claim 77, wherein said oblong beam is secured to said first harness through a connector extending a connector distance between said first harness and said oblong beam, and wherein said connector distance is adjustable.

81. The device of claim 80, wherein said connector comprises a releasable lock for fixing said connector distance.

82. The device of claim 80, wherein said connector comprises a flexible tether having an adjustable length.

83. The device of claim 82, wherein said flexible tether is elastic thereby forming a spring.

84. The device of claim 82, wherein said connector comprises a spool upon which is wound a portion of said flexible tether.

85. The device of claim 84, which further comprises:

a motor driving said spool; and a microprocessor controlling said motor in response to commands wirelessly received from a computerized mobile device.

86. The device of claim 71, wherein said oblong beam is secured to said second harness by an attachment structure shaped and dimensioned to firmly position a proximal end of said oblong beam.

87. The device of claim 86, wherein said attachment structure comprises a pocket and at least one keeper structure engaged by a medial portion of said oblong beam.

88. The device of claim 71, wherein said oblong beam further comprises:

a proximal end and a distal end;

said oblong beam having a first cross-sectional area near said proximal end and a second cross-sectional area near said distal end;

wherein said first cross-sectional area is larger than said second cross-sectional area.

\* \* \* \* \*